US008655830B2

(12) United States Patent
Mackay

(10) Patent No.: US 8,655,830 B2
(45) Date of Patent: Feb. 18, 2014

(54) SYSTEMS AND METHODS FOR REPORTING A CAUSE OF AN EVENT OR EQUIPMENT STATE USING CAUSAL RELATIONSHIP MODELS IN A BUILDING MANAGEMENT SYSTEM

(75) Inventor: Douglas P. Mackay, Los Angeles, CA (US)

(73) Assignee: Johnson Controls Technology Company, Holland, MI (US)

( * ) Notice: Subject to any disclaimer, the term of this patent is extended or adjusted under 35 U.S.C. 154(b) by 181 days.

(21) Appl. No.: 12/940,853

(22) Filed: Nov. 5, 2010

(65) Prior Publication Data

US 2011/0137853 A1 Jun. 9, 2011

Related U.S. Application Data

(63) Continuation-in-part of application No. 12/898,589, filed on Oct. 5, 2010.

(60) Provisional application No. 61/259,044, filed on Nov. 6, 2009, provisional application No. 61/249,191, filed on Oct. 6, 2009.

(51) Int. Cl.
G06F 17/00 (2006.01)

(52) U.S. Cl.
USPC .......................................................... 706/55

(58) Field of Classification Search
None
See application file for complete search history.

(56) References Cited

U.S. PATENT DOCUMENTS

| 4,872,397 | A |  | 10/1989 | Demeter et al. |
| 5,061,916 | A |  | 10/1991 | French et al. |
| 5,117,900 | A |  | 6/1992 | Cox |
| 5,870,768 | A |  | 2/1999 | Hekmatpour |
| 5,943,662 | A | * | 8/1999 | Baba et al. ...................... 706/23 |
| 6,157,943 | A |  | 12/2000 | Meyer |
| 6,167,316 | A |  | 12/2000 | Gloudeman et al. |
| 6,332,163 | B1 |  | 12/2001 | Bowman-Amuah |
| 6,366,832 | B2 |  | 4/2002 | Lomonaco et al. |
| 6,405,103 | B1 |  | 6/2002 | Ryan et al. |
| 6,487,457 | B1 |  | 11/2002 | Hull et al. |
| 6,687,698 | B1 |  | 2/2004 | Nixon et al. |
| 6,772,216 | B1 |  | 8/2004 | Ankireddipally et al. |
| 6,788,980 | B1 |  | 9/2004 | Johnson |
| 6,839,601 | B1 |  | 1/2005 | Yazback et al. |
| 6,842,776 | B1 |  | 1/2005 | Poisner |
| 6,845,396 | B1 |  | 1/2005 | Kanojia et al. |
| 6,862,589 | B2 |  | 3/2005 | Grant |

(Continued)

FOREIGN PATENT DOCUMENTS

WO    WO 02/21259    3/2002

OTHER PUBLICATIONS

Office Action for U.S. Appl. No. 12/898,589, mail date Apr. 22, 2013, 21 pages.

(Continued)

*Primary Examiner* — Kakali Chaki
*Assistant Examiner* — Mario Riojas Ramirez
(74) *Attorney, Agent, or Firm* — Foley & Lardner LLP

(57) ABSTRACT

A computerized method for evaluating and reporting a cause of a performance change in a building management system is shown and described. The method includes receiving an indication of a fault for building equipment of the building management system and determining a root cause for the fault by traversing a causal relationship model including the building equipment and other devices of the building management system.

20 Claims, 12 Drawing Sheets

(56) References Cited

U.S. PATENT DOCUMENTS

| | | | |
|---|---|---|---|
| 6,873,256 B2 * | 3/2005 | Lemelson et al. ......... 340/539.1 | |
| 6,895,513 B1 | 5/2005 | Balasubramaniam et al. | |
| 7,000,238 B2 | 2/2006 | Nadler et al. | |
| 7,017,162 B2 | 3/2006 | Smith et al. | |
| 7,039,591 B2 | 5/2006 | Ecklund et al. | |
| 7,117,504 B2 | 10/2006 | Smith et al. | |
| 7,151,966 B1 | 12/2006 | Baier et al. | |
| 7,152,090 B2 | 12/2006 | Amirisetty et al. | |
| 7,159,007 B2 | 1/2007 | Stawikowski | |
| 7,162,534 B2 | 1/2007 | Schleiss et al. | |
| 7,165,087 B1 | 1/2007 | Graupner et al. | |
| 7,219,154 B2 | 5/2007 | Blakley, III et al. | |
| 7,254,607 B2 | 8/2007 | Hubbard et al. | |
| 7,266,600 B2 | 9/2007 | Fletcher et al. | |
| 7,293,010 B2 | 11/2007 | Angele et al. | |
| 7,295,984 B2 | 11/2007 | Glynn | |
| 7,330,473 B1 | 2/2008 | Baier et al. | |
| 7,340,714 B2 | 3/2008 | Upton | |
| 7,343,428 B2 | 3/2008 | Fletcher et al. | |
| 7,350,184 B2 | 3/2008 | Upton | |
| 7,356,694 B2 | 4/2008 | Mayo et al. | |
| 7,373,410 B2 | 5/2008 | Monza et al. | |
| 7,376,959 B2 | 5/2008 | Warshavsky et al. | |
| 7,392,391 B2 | 6/2008 | Eibach et al. | |
| 7,398,307 B2 | 7/2008 | Dorland | |
| 7,406,982 B2 | 8/2008 | Pfaff et al. | |
| 7,461,039 B1 | 12/2008 | Gilman | |
| 7,634,555 B1 | 12/2009 | Wainscott, Jr. et al. | |
| 2002/0023091 A1 | 2/2002 | Silberberg et al. | |
| 2002/0059425 A1 | 5/2002 | Belfiore et al. | |
| 2002/0174178 A1 | 11/2002 | Stawikowski | |
| 2003/0023712 A1 | 1/2003 | Zhao et al. | |
| 2003/0028577 A1 | 2/2003 | Dorland et al. | |
| 2003/0033376 A1 | 2/2003 | Brownhill et al. | |
| 2003/0101170 A1 | 5/2003 | Edelstein et al. | |
| 2003/0120665 A1 | 6/2003 | Fox et al. | |
| 2003/0163450 A1 | 8/2003 | Borenstein et al. | |
| 2003/0163597 A1 | 8/2003 | Hellman et al. | |
| 2003/0177481 A1 | 9/2003 | Amaru et al. | |
| 2003/0179228 A1 | 9/2003 | Schreiber et al. | |
| 2004/0030739 A1 | 2/2004 | Yousefi'zadeh | |
| 2004/0081183 A1 | 4/2004 | Monza et al. | |
| 2004/0093331 A1 | 5/2004 | Garner et al. | |
| 2004/0093344 A1 | 5/2004 | Berger et al. | |
| 2004/0093559 A1 | 5/2004 | Amaru et al. | |
| 2004/0098401 A1 | 5/2004 | Angele | |
| 2004/0105424 A1 | 6/2004 | Skoczkowski et al. | |
| 2004/0216030 A1 | 10/2004 | Hellman et al. | |
| 2004/0216147 A1 | 10/2004 | Yanosy et al. | |
| 2004/0218591 A1 | 11/2004 | Ogawa et al. | |
| 2004/0225629 A1 | 11/2004 | Eder | |
| 2004/0267567 A1 | 12/2004 | Barrera et al. | |
| 2005/0044197 A1 | 2/2005 | Lai | |
| 2005/0086360 A1 | 4/2005 | Mamou et al. | |
| 2005/0198255 A1 | 9/2005 | Wainscott, Jr. et al. | |
| 2005/0222889 A1 | 10/2005 | Lai et al. | |
| 2006/0064468 A1 | 3/2006 | Brown et al. | |
| 2006/0070082 A1 | 3/2006 | Sridhar et al. | |
| 2006/0074980 A1 | 4/2006 | Sarkar | |
| 2006/0106473 A1 | 5/2006 | Enright et al. | |
| 2006/0161544 A1 | 7/2006 | Lee et al. | |
| 2006/0168178 A1 | 7/2006 | Hwang et al. | |
| 2006/0200433 A1 | 9/2006 | Flinn et al. | |
| 2007/0043687 A1 | 2/2007 | Bodart et al. | |
| 2007/0100981 A1 | 5/2007 | Adamczyk et al. | |
| 2007/0156498 A1 | 7/2007 | Zwerger et al. | |
| 2007/0185759 A1 | 8/2007 | Kataria et al. | |
| 2007/0233323 A1 | 10/2007 | Wiemeyer et al. | |
| 2007/0236346 A1 | 10/2007 | Helal et al. | |
| 2008/0009959 A1 | 1/2008 | Enright et al. | |
| 2008/0028068 A1 | 1/2008 | Nochta et al. | |
| 2008/0059559 A1 | 3/2008 | Gathman et al. | |
| 2009/0267540 A1 * | 10/2009 | Chemel et al. ................ 315/297 |
| 2011/0178977 A1 | 7/2011 | Drees | |

OTHER PUBLICATIONS

Office Action for U.S. Appl. No. 13/252,105, mail date Feb. 13, 2013, 10 pages.

* cited by examiner

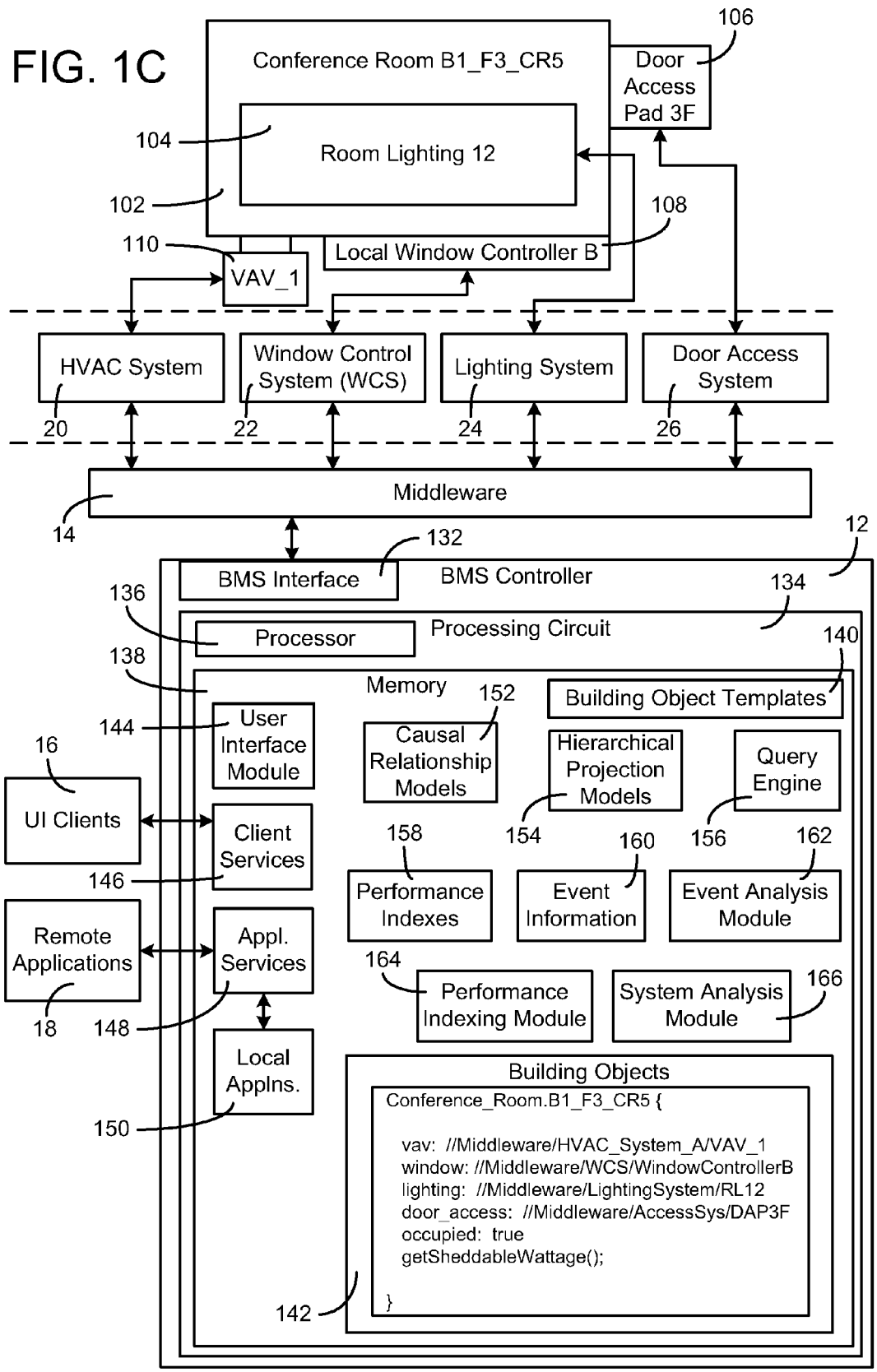

SYSTEMS AND METHODS FOR REPORTING A CAUSE OF AN EVENT OR EQUIPMENT STATE USING CAUSAL RELATIONSHIP MODELS IN A BUILDING MANAGEMENT SYSTEM

CROSS-REFERENCE TO RELATED APPLICATIONS

This is a continuation-in-part of U.S. application Ser. No. 12/898,589, filed Oct. 5, 2010, which claims priority to U.S. Provisional Application No. 61/249,191, filed Oct. 6, 2009. The present application also claims the benefit of U.S. Provisional Application No. 61/259,044, filed Nov. 6, 2009. U.S. application Ser. No. 12/898,589, U.S. Provisional Application No. 61/249,191 and U.S. Provisional Application No. 61/259,044 are hereby incorporated by reference in their entireties.

BACKGROUND

The present invention relates generally to the field of building management systems.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

SUMMARY

Some embodiments of the invention relate to a computerized method for evaluating and reporting a cause of a performance change in a building management system. The method includes receiving, at a processing circuit, an indication of a fault for building equipment of the building management system. The method further includes using the processing circuit to determine a root cause of the fault by traversing a causal relationship model including the building equipment and other devices of the building management system.

In one embodiment, using the processing circuit to determine a root cause may include identifying a building object directly associated with the fault, determining a causally-related building object using the identified building object and the causal relationship model traversal, retrieving historical data for the causally-related building object, and using the historical data to identify a cause of the fault. Traversing the causal relationship model may include traversing multiple levels of a causal relationship model to find the root cause of the fault.

In another embodiment, using the processing circuit to determine a root cause may include retrieving historical data for the other devices of the building management system using the causal relationship model, identifying a plurality of possible abnormalities in the historical data, and using time data in the historical data to identify the earliest abnormality as the root cause of the fault. The processing circuit may be configured to exclude an earliest abnormality in the historical data due to a determined inconsistency with the causal relationship model.

Another embodiment of the invention relates to a computer system for evaluating and reporting a cause of a performance change in a building management system. The computer system includes a processing circuit configured to receive an indication of a fault associated with building equipment of the building management system. The processing circuit is configured to determine a root cause of the fault by traversing a causal relationship model including the building equipment and other devices of the building management system.

The processing circuit may be configured to identify a building object associated with the fault, determine a causally-related building object using the identified building object and the causal relationship model, retrieve historical data for the causally-related building object from a memory, and use the historical data to identify a cause of the fault. The processing circuit may include a memory and the memory includes a fault cause analyzer that traverses multiple levels of a causal relationship model until the root cause for the fault is determined. The causal relationship model may include a plurality of software defined building objects and wherein at least two of the software defined building objects belong to different building subsystems. The processing circuit may include a system analysis module and the system analysis module includes an event analyzer, a causal relationship analyzer, a performance index analyzer, and a fault cause analyzer. The fault cause analyzer may coordinate the causal relationship traversal and the fault cause analyzer uses information from the event analyzer and the performance index analyzer to select from a plurality of possible root causes for the fault.

The processing circuit may be configured to traverse the causal relationship model to identify other devices, retrieve historical data for each identified device, process the historical data to identify possible abnormalities, use time data for the possible abnormalities to determine the earliest identified abnormality, and evaluate causal relationships to determine if the earliest abnormality could have been the root cause of the fault. The processing circuit may be configured to traverse the causal relationship model to identify additional devices if the earliest abnormality is determined to not be the root cause of the fault. Traversing the causal relationship model may include following causal relationship paths that are not coextensive with hardware, logical, or hardware and logical communications connections of the building management system.

Another embodiment relates to a non-transitory computer-readable storage medium having stored thereon machine-readable instructions for causing, when executed, one or more machines to perform a plurality of steps. The steps include receiving an indication of a fault for building equipment of the building management system. The steps further include determining a root cause of the fault by traversing a causal relationship model including the building equipment and other devices of the building management system. The steps may also include reporting a cause of a performance change in a building management system based on the determined root cause of the fault.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIGS. 1C-D are detailed block diagrams of a portion of the BMS shown in FIG. 1B, according to an exemplary embodiment;

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Conventional building management systems receive fault indications from varying subsystems and devices. A server or a client front-end conventionally causes the fault to be reported to a user via, e.g., a graphical user interface. Other building management systems analyze data (e.g., trends, statistics, etc.) to determine whether to derive a fault from the analyzed data.

The present application relates to systems and methods for determining and reporting a root cause for a received or determined fault. A causal relationship model including the building equipment associated with the fault is traversed to determine the root cause. This approach can advantageously help building managers or engineers identify and address a fault's source rather than merely identifying and addressing a fault's downstream effects.

Maintaining Building Objects and Causal Relationship Models for the Building Objects Embodiments of the present disclosure include a computer system for a BMS (e.g., a BMS controller) that has been configured to help make differences in building subsystems transparent at the human-machine interface, application, or client interface level. The computer system is configured to provide access to different building devices and building subsystems using common or unified building objects (e.g., software objects stored in memory) to provide the transparency. In an exemplary embodiment, a software defined building object (e.g., "virtual building object," "virtual device") groups multiple properties from disparate building systems and devices into a single software object that is stored in memory and provided by a computer system for interaction with other systems or applications (e.g., front-end applications, control applications, remote applications, client applications, local processes, etc.). Multiple software defined building objects may be described as forming an abstraction layer of a BMS software framework or architecture. Benefits such as allowing developers to write applications that will work regardless of a particular building subsystem makeup (e.g., particular naming conventions, particular protocols, etc.) may be provided by such software defined building objects. Such software defined building objects are further described in Ser. No. 12/887,390, filed Sep. 21, 2010 to Huneycutt et al. application Ser. No. 12/887,390 is hereby incorporated by reference in its entirety.

Figure 1A:
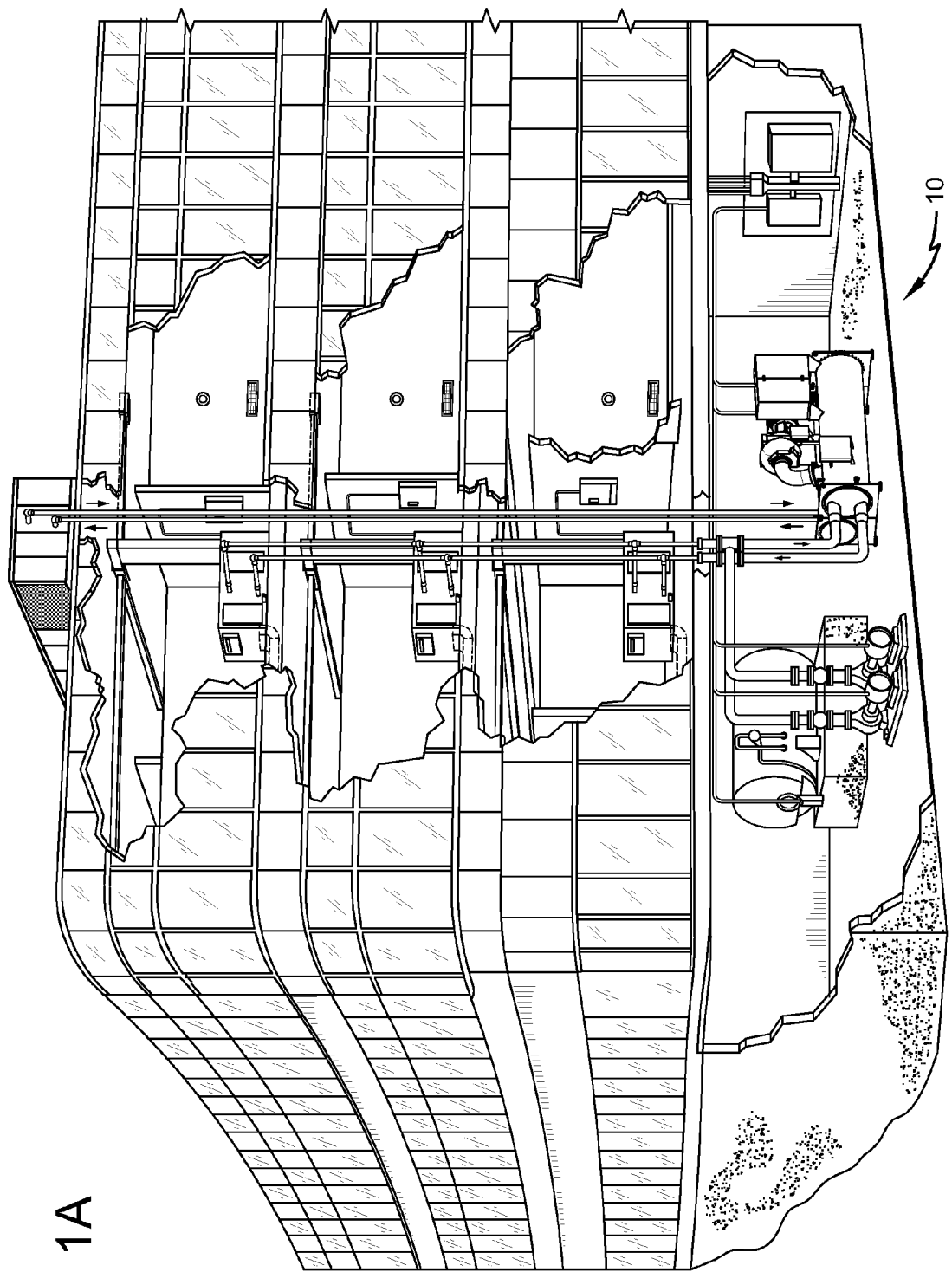
FIG. 1A is a perspective view of a building including a BMS, according to an exemplary embodiment.

Referring now to FIG. 1A, a perspective view of a building 10 is shown, according to an exemplary embodiment. A BMS serves building 10. The BMS for building 10 may include any number or type of devices that serve the building. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

Figure 1B:
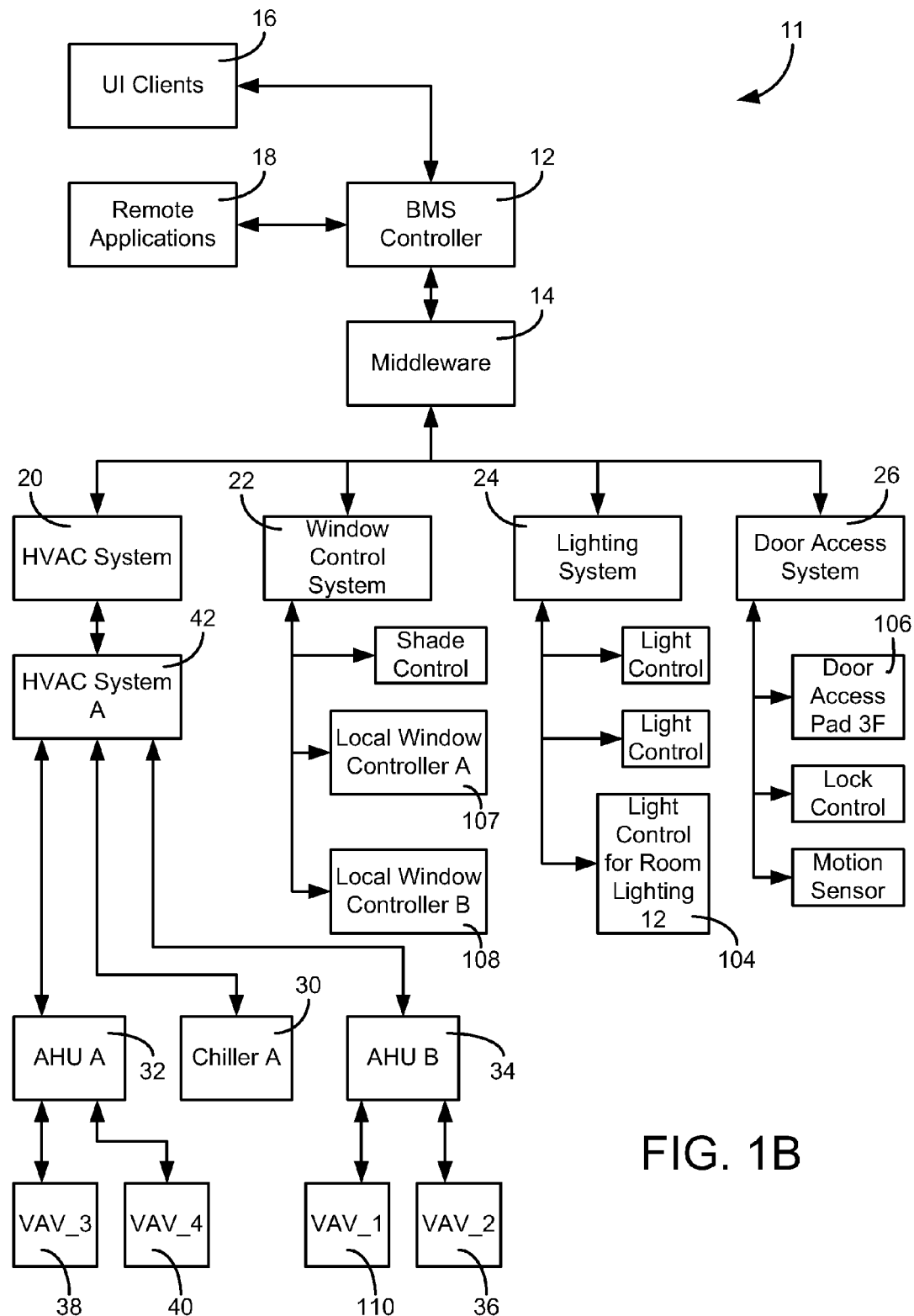
FIG. 1B is a block diagram of the BMS for the building of FIG. 1A, according to an exemplary embodiment.

Referring now to FIG. 1B, a block diagram of an exemplary BMS 11 for building 10 of FIG. 1A is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As illustrated in FIG. 1B, a BMS subsystem includes HVAC system 20. HVAC system 20 is shown to include a lower-level HVAC system 42, named "HVAC system A." For example, HVAC system 20 may control HVAC operations for a given building (e.g., building 10), while "HVAC system A" 42 controls HVAC operations for a specific floor of that building. "HVAC system A" 42 is connected to air handling units (AHUs) 32, 34, named "AHU A" and "AHU B" in the BMS, respectively. AHU 32 may control variable air volume (VAV) boxes 38, 40, named "VAV_3" and "VAV_/4" in the BMS. Likewise, AHU 34 may control VAV boxes 36 and 110, named "VAV_2" and "VAV_1." HVAC system 42 may also include chiller 30, named "Chiller A" in the BMS. Chiller 30 may provide chilled fluid to AHU 32 and/or to AHU 34.

HVAC system 42 may also receive data from AHUs 32, 34 (e.g., a temperature setpoint, a damper position, temperature sensor readings). HVAC system 42 may then provide such BMS inputs up to HVAC system 20 and on to middleware 14 and BMS controller 12. Similarly, other BMS subsystems may receive inputs from other building devices or objects and provide them to middleware 14 and BMS controller 12 (e.g., via middleware 14). For example, a window control system 22 may receive shade control information from one or more shade controls, may receive ambient light level information from one or more light sensors, or may receive other BMS inputs (e.g., sensor information, setpoint information, current state information, etc.) from downstream devices. Window control system 22 may include window controllers 107, 108, named "local window controller A" and "local window controller B" in the BMS, respectively. Window controllers 107, 108 control the operation of subsets of the window control system 22. For example, window controller 108 may control window blind or shade operations for a given room, floor, or building in the BMS. Lighting system 24 may receive lighting related information from a plurality of downstream light controls, for example, from room lighting 104. Door access system 26 may receive lock control, motion, state, or other door related information from a plurality of downstream door controls. Door access system 26 is shown to include door access pad 106, named "Door Access Pad 3F" which may grant or deny access to a building space (e.g., floor, conference room, office, etc.) based on whether valid user credentials are scanned or entered (e.g., via a keypad, via a badge-scanning pad, etc.).

BMS subsystems 20-26 are shown as connected to BMS controller 12 via middleware 14 and are configured to provide BMS controller 12 with BMS inputs from the various BMS subsystems 20-26 and their varying downstream devices. BMS controller 12 is configured to make differences in building subsystems transparent at the human-machine interface or client interface level (e.g., for connected or hosted user interface (UI) clients 16, remote applications 18, etc.). BMS controller 12 is configured to describe or model different building devices and building subsystems using common or unified building objects (e.g., software objects stored in memory) to help provide the transparency. Benefits such as allowing developers to write applications that will work regardless of the building subsystem makeup may be provided by such software building objects.

Figure 1D:
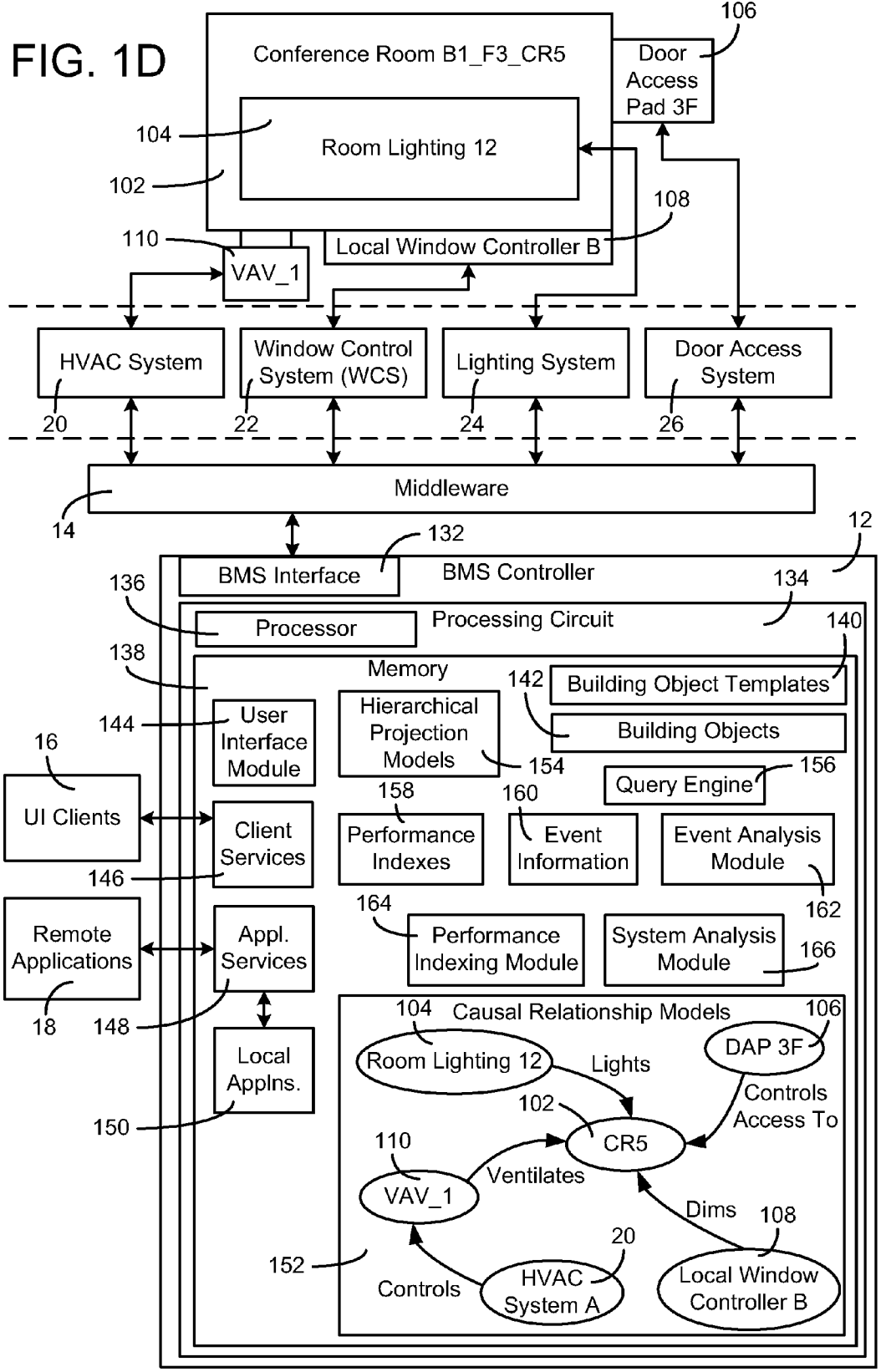

FIGS. 1C-D are detailed block diagrams of a portion of the BMS as shown in FIG. 1B, according to an exemplary embodiment. Many different building devices connected to many different BMS subsystems are shown to affect conference room "B1_F3_CR5." For example, conference room 102 includes or is otherwise affected by VAV box 110, window controller 108 (e.g., a blind controller), a system of lights 104 named "Room Lighting 12," and door access pad 106. As is viewable in FIGS. 1C-D and also in FIG. 1B, VAV box 110, window controller 108, lights 104, and door access pad 106 are not otherwise related. Each of the building devices shown at the top of FIGS. 1C-D may include local control circuitry configured to provide signals to their supervisory controllers or more generally to the BMS subsystems 20-26. The local control circuitry of the building devices shown at the top of FIGS. 1C-D may also be configured to receive and respond to control signals, commands, setpoints, or other data from their supervisory controllers. The local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. "Room Lighting 12" 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

In conventional buildings, the BMS subsystems are often managed separately. Even in BMSs where a unified graphical user interface is provided, a user must typically click through a hierarchy such as is shown in FIG. 1B to view data points for a lower level device or to make changes (e.g., setpoint adjustments, etc.). Such separate management can be particularly true if the subsystems are from different manufacturers or communicate according to different protocols. Conventional control software in such buildings is sometimes custom written to account for the particular differences in subsystems, protocols, and the like. Custom conversions and accompanying software is time consuming and expensive for end-users or their consultants to develop. A software defined building object of the present disclosure is intended to group otherwise ungrouped or unassociated devices so that the group may be addressed or handled by applications together and in a consistent manner.

In an exemplary BMS controller, a conference room building object may be created in memory for each conference room in the building. Further, each conference room building object may include the same attribute, property, and/or method names as those shown in FIGS. 1C-D. For example, each conference room may include a variable air volume box attribute, a window attribute, a lighting attribute, and a door access device attribute. Such an architecture and collection of building objects is intended to allow developers to create common code for use in buildings regardless of the type, protocol, or configuration of the underlying BMS subsystems. For example, a single automated control application may be developed to restrict ventilation to conference rooms when the conference rooms are not in use (e.g., when the occupied attribute is equal to "true"). Assuming proper middleware and communications systems, the setup or the installation of a different BMS device or an application for a different BMS may not need to involve a re-write of the application code. Instead, for example, if a new building area is designated as a conference room, a new conference room building object can be created and set-up (e.g., a variable air volume unit mapped to the conference room building object). Once a new conference room building object is created and set-up, code written for controlling or monitoring conference rooms can interact with the new conference room (and its actual BMS devices) without modification.

Referring still to FIGS. 1C-D, the BMS is shown to include a BMS interface 132 in communication with middleware 14 of the BMS. Middleware 14 is generally a set of services that allow interoperable communication to, from, or between disparate BMS subsystems 20-26 of the BMS (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, in various exemplary embodiments, middleware 14 and BMS controller 12 are integrated. For example, middleware 14 may be a part of BMS controller 12.

BMS interface 132 (e.g., a communications interface) can be or include wired or wireless interfaces (e.g., jacks, antennas, transmitters, receivers, transceivers, wire terminals, etc.) for conducting data communications with another system or network. For example, BMS interface 132 can include an Ethernet card and port for sending and receiving data via an Ethernet-based communications network. In another example, BMS interface 132 includes a WiFi transceiver for communicating via a wireless communications network. BMS interface 132 may be configured to communicate via local area networks or wide area networks (e.g., the Internet, a building WAN, etc.). BMS interface 132 is configured to receive building management inputs from middleware 14 or directly from one or more BMS subsystems 20-26. BMS interface 132 can include any number of software buffers, queues, listeners, filters, translators, or other communications-supporting services.

BMS controller 12 is further shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.). According to an exemplary embodiment, memory 138 is communicably connected to processor 136 via electronics circuitry. Memory 138 (e.g., memory unit, memory device, storage device, etc.) is one or more devices for storing data and/or computer code for completing and/or facilitating the various processes described in the present disclosure. Memory 138 may be RAM, hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138, for example, includes computer code for executing (e.g., by processor 136) one or more processes described herein. When processor 136 executes instructions stored in memory 138 for completing the various activities described herein, processor 136 generally configures BMS controller 12 and more particularly processing circuit 134 to complete such activities.

Memory 138 is shown to include building objects 142 and building object templates 140, which can be used to construct building objects of predefined types. For example, building object templates 140 may contain a "Conference Room" template that can be used to define conference room objects in building objects 142.

In FIG. 1C, software defined building object 142 named "Conference_Room.B1_F3_CR5" is illustrated as existing within memory 138 of BMS controller 12. To create a particular building object (for example, a software object of an AHU), inputs from building management resources may be mapped (e.g., linked, associated, described, grouped) to attributes of the particular building object. A simplified exemplary result of such mapping might be an object such as:

```
Floor1AHU {
    temperature_sensor: Floor1AHU.controllerB.TempS;
    setpoint: Floor1AHU.345server.Setpoint;
    damper_position: Floor1AHU.345server.Damper;
}
```

The building object's name is "Floor1AHU" which may conform to a naming convention indicating that it is the AHU serving the first floor of a building. The building object "Floor1AHU" has three values or attributes: temperature_sensor, setpoint, and damper_position that are mapped to the particular BMS resources of "Floor1AHU.controllerB.TempS," "Floor1AHU.345server.Setpoint," and "Floor1AHU.345server.Damper," respectively. The mapping provides a description for BMS or computing resources (e.g., back end software applications or client applications) so that the BMS or computing resources can identify, access, display, change, or otherwise interact with the particular BMS resources mapped to "Floor1AHU" even when the resources are associated with different servers or controllers.

For example, BMS controller 12 may group inputs from the various subsystems 20-26 to create a building object "Conference_Room.B1_F3_CR5" including inputs from various systems controlling the environment in the room. An exemplary software defined building object might be an object such as:

```
Conference_Room.B1_F3_CR5 {
    vav: //Middleware/HVAC_System_A/VAV_1;
    window: //Middleware/WCS/WindowControllerB;
    lighting: //Middleware/LightingSystem/RL12;
    door_access: //Middleware/AccessSys/DAP3F;
    occupied: true;
    getSheddableWattage( );
}
```

The software defined building object's name is "Conference_Room.B1_F3_CR5" which may conform to a naming convention indicating that it is a conference room in a particular location in the building, e.g. Conference Room 5 is on Floor 3 of Building 1. The building object "Conference_Room.B1_F3_CR5" has several values or attributes including vav, window, lighting, door_access, occupied, and getSheddableWattage. The attributes of vav, window, lighting, and door_access are mapped to the particular BMS resources of "HVAC_System_A/VAV_1," "WCS/WindowControllerB," "LightingSystem/RL12," and "AccessSys/DAP3F," respectively. The mapping provides a description for BMS or computing resources (e.g., back end software applications, client applications, BMS control routines, etc.) so that the BMS or other computing resources can identify, access, display, change or otherwise interact with the software defined building object in a meaningful way (e.g., in a way that allows changes to be made to the mapped devices). A software defined building object may be mapped to BMS inputs manually. For example, the mapping may be completed by a user with a graphical user interface tool that requires a user to either type in or "drag and drop" BMS inputs to an object. Software defined building objects may also or alternatively be mapped to BMS inputs by computerized systems configured to provide varying degrees of mapping automation. For example, patent application Ser. No. 12/887,390, filed Sep. 21, 2010 and incorporated herein by reference in its entirety, describes systems and methods for creating software defined building objects and mapping BMS inputs to the building objects. "Occupied" is a boolean property unique to the "Conference_Room.B1_F3_CR5" building object. GetSheddableWattage( ) is a method unique to the "Conference_Room.B1_F3_CR5" building object.

As an example of how a building object may be used by the system, all conference room building objects may have the same attributes as "Conference_Room.B1_F3_CR5" listed above. Once each of the conference rooms in building 10 are mapped to a software defined conference room building object, the rooms may be treated the same way in code existing in BMS controller 12, remote applications 18, or UI clients 16. Accordingly, an engineer writing software code for UI clients 16, remote applications 18 or BMS controller 12 can know that each conference room will have attributes listed above (e.g., VAV, window, lighting, door access, occupied, getSheddableWattage( ). Therefore, for example, rather than having to know an address for a particular variable air volume controller in a particular HVAC system, a given conference room's VAV controller may be available at the conference room's vav attribute.

The creation of a software defined building object may include three steps:
1. defining a building object template;
2. creating an instance of a building object based on the template; and
3. mapping or binding building object properties or attributes to particular BMS devices or inputs.

As an example of the first step, a conference room template or class may be created (e.g., by a developer, by a rapid application development module, etc.) such as the following:

```
public class Conference_Room extends Device {
    def vav
    def window
    def lighting
    def door_access
    def occupied
    def getSheddableWattage( ) { ... }
}
```

In some embodiments, the building object template or class may be a Groovy/Java class configured to inherit a series of benefits such as the ability to extend existing devices.

An instance of the class may be created and named (for example "B1_F3_CR5"). The names can be descriptive, based on an automated routine configured to find building objects, manually applied, or otherwise.

The mapping or binding process maps disparate BMS devices or inputs to the instance of the building object.

Once the building objects are created and BMS devices or inputs are mapped to the building objects, software defined building objects may be used by applications (local, remote, client, etc.) with any suitable programming language or syntax. As an example of interaction with the software defined building object used in previous examples, the following exemplary piece of code is configured to load "B1_F3_CR5" as ConfRoom, print the result of the method getSheddableWattage for ConfRoom, and set the window parameter to "50" (which may be sent to WCS 22 or "Local Window Controller B" 108 via BMS interface 132 or middleware 14 shown in FIGS. 1C-D to cause the blinds to be 50 percent open) when the ConfRoom object is saved.

```
def ConfRoom=factory.load("Conference_Room.B1_F3_CR5")
    println ConfRoom.getSheddableWattage( );
    ConfRoom1.window=50
    factory.save(ConfRoom)
```

In an exemplary embodiment, application services 148 of BMS controller 12 shown in FIGS. 1C-D may be or include web services configured to allow remote applications 18 or local applications 150 to access building object templates 140, building objects 142, causal relationship models 152, hierarchical projection models 154 and query engine 156 directly or indirectly via a set of internet application programming interfaces. To support such interfaces, each software defined building object may include or be exposed to a toXML( ) method configured to describe the software defined building object using XML. In another exemplary embodiment, application services 148 allows remote applications 18 on other BMS controllers to communicate with BMS controller 12 over a network.

Conventional building systems do not include organizational models which link and describe building objects by causal relationships (e.g., "ontological models"). Memory 138 is shown to include causal relationship models 152, which store the causal relationships between objects in building objects 142. For example, a "ventilates" causal relationship may be used to relate a VAV box object to a conference room object.

Memory 138 is also shown to include hierarchical projection models 154. While the models of the present disclosure are not stored or represented as static hierarchical models, systems and methods of the present disclosure are configured to allow the creation of multiple hierarchical views of the causal relationship model. Each "view" may be defined as a hierarchical model (e.g., tree model, uni-directional tree, top-down tree having a head node) in memory 138 to which a causal relationship model can be applied. In other words, one or more hierarchical models may be created in memory 138 and one or more causal relationships can be projected onto the one or more hierarchical models.

Memory 138 is also includes client services 146 configured to allow interaction between internal or external clients or applications and BMS controller 12. Client services 146, for example, may include web services or application programming interfaces available for communication by UI clients 16 and remote applications 18 (e.g., an energy monitoring application, an application allowing a user to monitor the performance of the BMS, an automated fault detection and diagnostics system, etc.).

Memory 138 further includes user interface module 144. User interface module 144 is configured to generate one or more user interfaces for receiving input from a user. User interface module 144 may be configured to provide, for example, a graphical user interface, a voice driven interface, a text-based interface, or another interface for receiving user input regarding the mapping of BMS inputs to building objects. In an exemplary embodiment, user interface module 144 is an HTML-based application configured to be served by, for example, client services 146 or another web server of BMS controller 12 or another device. User interface module 144 may be configured to prompt a user (e.g., visually, graphically, audibly, etc.) for input regarding building objects 142, building object templates 140, causal relationship models 152 or hierarchical projection models 154. In an exemplary embodiment, user interface module 144 prompts the user to create (or otherwise provides a user interface for creating) a template building object 140. User interface module 144 may also prompt the user to map BMS inputs to the template building object. User interface module 144 may receive and handle the user inputs to initiate the storage of received input mappings. In another exemplary embodiment, user interface module 144 may prompt the user to identify, define, store, modify or delete a causal relationship in causal relationship models 152. For example, a user may use a GUI to create a causal relationship between defined building objects in building objects 142, e.g. relating a conference room object to a VAV box object. User interface module 144 may further be configured to generate and serve graphical user interfaces having information displays of building objects and/or causal relationships. User interface module 144 may also be configured to utilize query engine 156 to query and retrieve information about causal relationships in causal relationship models 152 or via hierarchical projection models 154.

In FIG. 1D, causal relationship models 152 is shown to include a causal relationship model for conference room 102 and a number of building objects (e.g. building objects 30, 32, 40, etc. associated with devices shown in FIG. 1B) that affect access to conference room 102 or the environment of conference room 102. The causal relationships from these building objects to conference room 102 are identified and mapped back to conference room 102. For example, VAV box 110 is shown linked to conference room 102 with a directional link described by the name or tag "ventilates." This link represent the causal relationship between VAV box 110 and conference room 102. More particularly, the link identifies the causal relationship between VAV box 110 and conference room 102 as one where VAV box 110 provides ventilation to conference room 102. VAV box 110 is affected by HVAC System 20 and so the corresponding causal relationship is shown as being directional from conference room 102 to VAV box 110 with "controls" describing the relationship. Similarly, room lighting 104 lights conference room 102, window controller 108 dims conference room 102, and access pad 106 controls access to conference room 102. As described above, conference room 102 is not a building device that is associated with any one particular controller or BMS subsystem. As a complement to the software defined building object for the conference room, the exemplary causal relationship information structure shown at the bottom of FIG. 1D provides a multi-level relationship map that more clearly represents the complex control environment of the actual conference room shown at the top of FIG. 1D. In addition to more coding and software development advantages, the causal relationship models can provide new user interface views, more robust searching "show me all VAV boxes that ventilate conference rooms," new fault detection and diagnostics tools, and other advantages.

Conventional building systems do not include organizational models which link and describe building objects by causal relationships (e.g., "ontological models"). A key feature of an ontological model is the ability to define relationships between dissimilar object types. A conventional hierarchical model may have an HVAC server object and a "VAV box" that is a member of the HVAC server object due to its control connection. Such a hierarchical model allows objects to be handled in a hierarchical manner, but lacks the ability to interrelate objects that do not follow the chain of inheritance. Causal relationships or ontological models, however, allow dissimilar objects to be related, thereby adding layers of description, flexibility, and robustness to the system. For example, a "ventilates" causal relationship may be used to relate a VAV box object to a conference room object, even though VAV box objects and conference room objects are dissimilar. Memory 138 is shown to include causal relationship models 152, which store the causal relationships between objects in building objects 142.

Figure 2A:
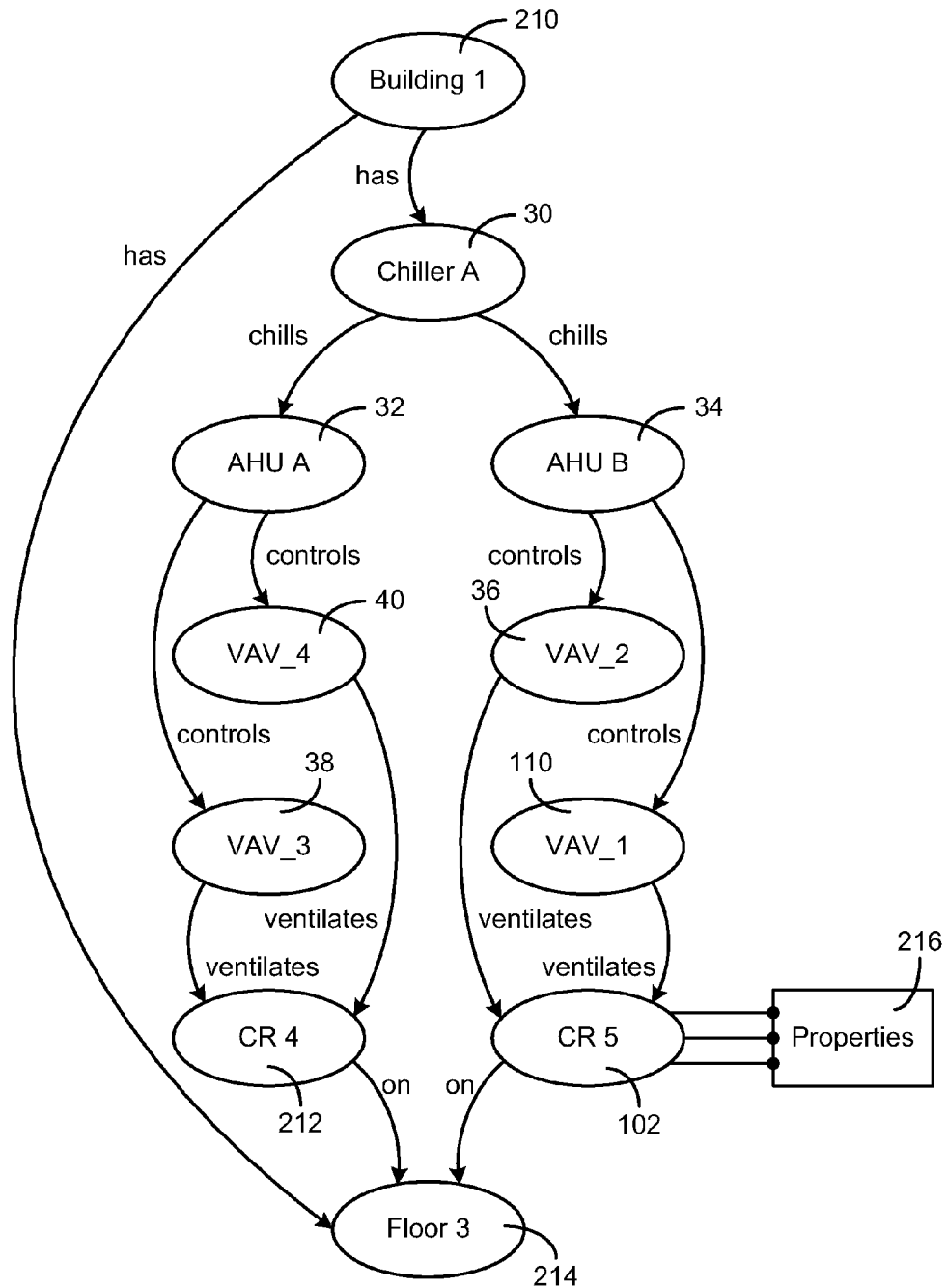
FIGS. 2A-B are diagrams of causal relationship models, according to an exemplary embodiment.
Figure 2B:
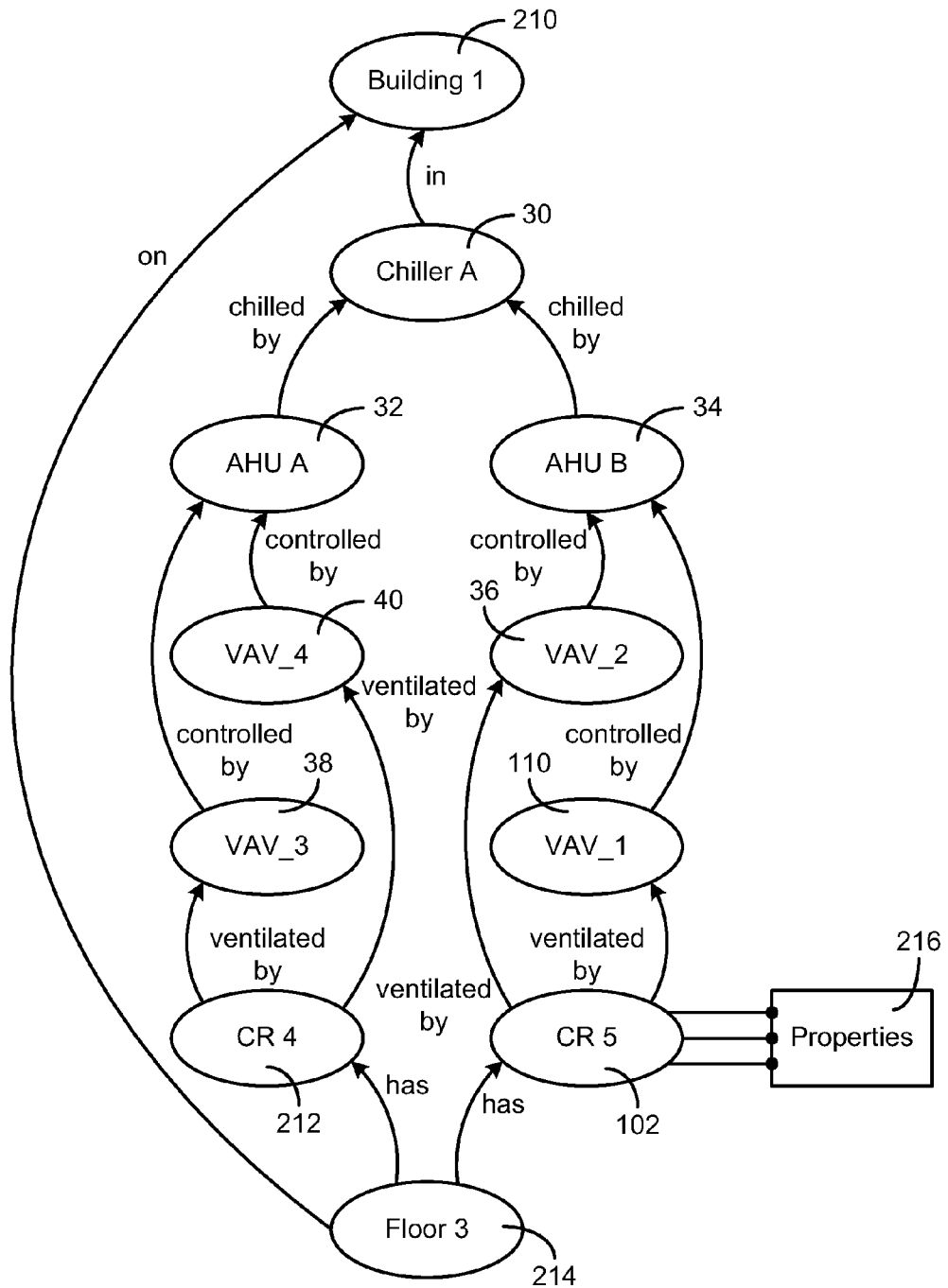

FIGS. 2A-B illustrate two exemplary causal relationship models. In FIG. 2A, causal relationships are shown between various building objects. Building object 210, named "Building 1" in the BMS, has causal relationships with chiller 30 and floor 214, named "Floor 3." The causal relationship "has" is shown to link and define the relationships between building 210, floor 214 and chiller 30. Chiller 30, in turn, has causal relationships with AHUs 32, 34, i.e. it "chills" the air passing through AHUs 32, 34. AHU 32, in turn, has a causal relationship, "controls," with VAV boxes 38, 40. Similarly, AHU 34 has a causal relationship, "controls," with VAV boxes 36, 110. Likewise, VAV boxes 38, 40 have "ventilates" causal relationships with conference room 212, named "Conference Room 4" or "CR4" in the BMS. Similarly, VAV boxes 36, 110 have "ventilates" causal relationships with conference room 102, named "Conference Room 5" or "CR5" in the BMS. CR5 102 is shown to have properties 216, which can be created by default when a new conference room object is added to the BMS, or created by the BMS or a user when more information about the conference room becomes available. Finally, conference rooms 102, 212 are shown to have causal relationships with floor 214, denoting that both rooms are "on" floor 3. As is illustrated with conference room CR5, a software defined building object can be causally related with one or more actual devices (e.g., VAV_1) or with other software defined building objects (e.g., "Floor 3").

Causal relationship models may be stored in memory in any number of ways. In one embodiment, causal relationship models may be stored within one or more tables. For example, a table may have columns for a relationship type (e.g., a relationship description), a first object identifier, and a second object identifier. With reference to FIG. 2A, a row entry in such a table may include "has" in the relationship column, "Building 1" in the first object identifier column, and "Floor 3" in the second object identifier column. In this way, causal relationship models 152 can be easily queried by relationship type, first object identifier and/or second object identifier. In another embodiment, a different table can be established for every type of causal relationship in the system. For example, a "controls" table may be established with a "source identifier" field and a "destination identifier" field. Referring to FIG. 2A, in a row for such a table "AHU B" would populate the "source identifier" field and "VAV_2" would populate the "destination identifier" field. In other embodiment, each software-defined building object may include a number of causal relationship properties or attributes that store the causal relationships. For example, a building object for "CR 4" shown in FIG. 2A might include a "ventilated by" property that is a delimited string of devices that ventilate CR 4 (e.g., ventilated by: VAV_3, VAV_4). Any number of suitable information structures for representing the causal relationship may be stored in memory.

FIG. 2B illustrates another exemplary causal relationship model for the building objects in FIG. 2A. In FIG. 2B, causal relationships between building objects are linked with causal relationships that have a directionality that is opposite to that shown in FIG. 2A. The causal relationship model of FIG. 2B may co-exist with the model shown in FIG. 2A. In other embodiments, only one of FIG. 2A and FIG. 2B will exist for a BMS. A set-up process may prompt a user for whether a "top-down" or "bottom-up" directionality is desired. In some embodiments the causal relationship model will be maintained and stored on a "bottom-up" basis such as that shown in FIG. 2B. In a system where the causal relationship models of FIG. 2A and FIG. 2B co-exist, FIG. 2A's causal relationship "has" that links building 210 to chiller 30 in FIG. 2A may have a corresponding causal relationship "in" that links chiller 30 to building 210 in FIG. 2B.

Causal relationship models such as those shown in FIGS. 2A-B may be created in different ways according to varying embodiments of the invention. In some embodiments, for example, a user may be prompted to create, or an automated system may create, a model with immediate references to particular building objects. In other embodiments, the system may prompt or otherwise allow a user to define causal relationship classes or templates of causal relationship models that will later be used and reused for particular instances of causal relationship models and objects.

In an exemplary embodiment, a specification of a class, class relationships, and properties can be defined generally as a template. For example, a template for an HVAC class may include default causal relations to equipment objects, such as VAV boxes, and to location objects, such as a floor or building. The representation of the class may be in the form of a directed graph (regardless of the underlying information structure) and not a conventional device tree form. Default properties or attributes may be established for one or more of the nodes. Instantiated objects can then be created or mapped using the relational template. The created causal relationship models may be modified at run-time or via a tool that allows modification outside of a run-time environment. For example, a tool may be provided for adding, modifying, or removing relationships, objects, classes, properties, attributes, and the like. When edits are made, the computing system or tool may be configured to dynamically adjust the model's structure (e.g., as the model is not stored as a static tree hierarchy). For example, if access pad 106 is no longer used to control access to conference room 102, the causal relationships pointing to access pad 106 may be deleted as well as its corresponding building object—but the rest of the model remains intact and unaffected. While the causal relationship models shown in FIGS. 2A-B primarily relate to software defined objects for building devices, many different building object relationships may be modeled using the systems and methods of the present disclosure. For example, other building entities (e.g., departments, employees, etc.) may be mapped to the BMS devices or software objects thereof. Therefore, using the causal relationship approach building devices may and the BMS may be linked with other enterprise systems (e.g., an HR management system having employee objects).

Figure 3:
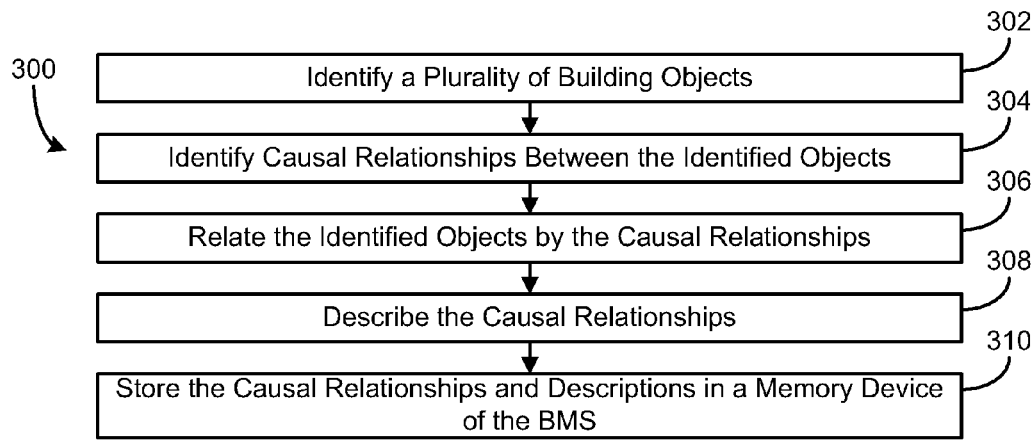
FIG. 3 is a flow diagram of a process for building a causal relationship model of the BMS, according to an exemplary embodiment.

Referring now to FIG. 3, a flow chart of a process 300 for organizing and using information in a building management system (BMS) is shown, according to an exemplary embodiment. Process 300 includes identifying a plurality of building objects (e.g., including building devices, software defined building objects, or other inputs to the BMS that affect the building environment) (step 302). Process 300 also includes identifying the causal relationships between the identified building objects (step 304). Steps 302, 304 may include testing building inputs and outputs for the causal relationships using an automated process. The identifying steps may also or alternatively include using an automated process to analyze characteristics of BMS devices and signals to create software defined building objects and their causal relationships to each other. In yet other exemplary embodiments, the identifying steps include causing a graphical user interface to be displayed that allows a user to input the building objects and the causal relationships between the objects.

Process 300 is further shown to include relating the identified objects by the causal relationships (step 306). Relating the identified objects by causal relationships may be completed by an automated process (e.g., based on testing, based on signal or name analysis at a commissioning phase, etc.) or by user configuration (e.g., of tables, of graphs via a graphical user interface, etc.). In an exemplary embodiment, a graphical user interface may be provided for allowing a user to draw directional links between building objects. Once a link is drawn, a computerized process may cause a dialog box to be shown on the GUI for allowing a user to describe the created causal relationship.

Process 300 is yet further shown to include describing the causal relationships (step 308). The description may be found and stored using any of the previously mentioned processes (e.g., automated via testing, manually input via a keyboard or other user input device, etc.). In one set of exemplary embodiments, the user is able to select (e.g., via a drop down box, via a toolbox, etc.) from a pre-defined list of possible causal relationship descriptions or to insert (e.g., type) a custom causal relationship description at a graphical user interface.

Process 300 is yet further shown to include storing the causal relationships and descriptions in a memory device of the BMS (step 310). The causal relationships may be stored using any of the above-described information structures (e.g., stored in tables, stored as lists linked to object properties, stored as a systems of linked lists, etc.).

Referring again to FIGS. 1C-D, while the causal relationship models of the present disclosure may not be stored or represented as static hierarchical models (e.g., a tag-based hierarchical model description), systems and methods of the present disclosure are configured to allow the creation of multiple hierarchical views of the causal relationship models. Each "view" may be defined as a hierarchical model (e.g., tree model) in memory to which one or more causal relationship models can be applied or projected. For example, at least two different hierarchical models may be used to describe the models of FIGS. 2B-C as shown below:

```
        <Conference Room>
            <VAV Box>
              <AHU>
            <VAV Box/>
        <Conference Room/>
    OR
        <AHU>
            <VAV Box>
              <Conference Room/>
            <VAV Box/>
        <AHU>
```

The first example shows a small hierarchical tree of building objects related to a conference room. For example, a conference room may be ventilated by a VAV box, which in turn is controlled by an AHU. In the second example, a similar tree is shown, but from the perspective of an AHU. The AHU may control a VAV box, which in turn ventilates a conference room. Any number or type of hierarchical models may be created and used to describe complex causal relationship models. In conventional systems, a building may only be described using a single static hierarchical tree (e.g., top down, one head node, showing control connections). The present disclosure allows the user or the system to establish many different new information structures by applying desired hierarchical models (e.g., bottom-up, top-down, selecting a new head node, etc.) to the stored causal relationship models. The hierarchical models may be used for reporting, displaying information to a user, for communication to another system or device (e.g., PDA, client interface, an electronic display, etc.), or for further searching or processing by the BMS or the computing system.

Each level of the resultant hierarchical trees may be optionally constrained or not constrained to a certain number of entities (this may be set via by updating one or more variables stored in memory, providing input to a user interface, by coding, or otherwise). In the first hierarchical result shown above, for example, only a single primary VAV box may be specified to be shown for each conference room, even though there may be more VAV boxes associated with the conference room. In an un-constrained hierarchical result, the hierarchical list for each conference room would include all related building objects.

As mentioned above, the BMS controller may be configured to use causal relationship models that may be updated during run time (e.g., by one or more control processes of the system, by user manipulation of a graphical user interface, etc.). Any modification of the causal relationship structure, in such embodiments, may be immediately reflected in applications of hierarchical models. In other words, as the building changes, the BMS controller (with or without the aid of a user) may be configured to update the causal relationship models which in turn will be reflected in the results of applying a hierarchical models to the causal relationships.

Figure 4:
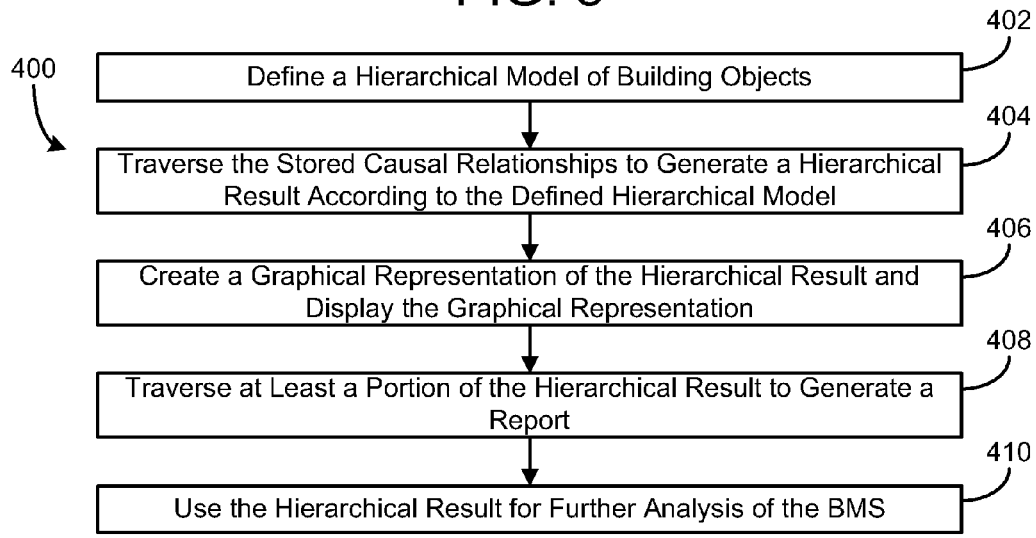
FIG. 4 is a flow diagram of a process for using a hierarchical model of the BMS, according to an exemplary embodiment.

Referring now to FIG. 4, a process 400 for using a hierarchical model of building objects is shown, according to an exemplary embodiment. Process 400 includes defining a hierarchical model of building objects (e.g., such as those shown above or otherwise formatted) (step 402). Process 400 also includes traversing the stored causal relationships to generate a hierarchical result according to the defined hierarchical model (step 404). Alternatively, the hierarchical result may be generated by querying the stored causal relationship. For example, a tree storing causal relationships may be traversed to generate the hierarchical results, whereas a table storing causal relationships may be queried.

Step 404 may be conducted by one or more client applications configured to have access to the causal relationships, by a process of a server whereby only the hierarchical results are provided to client applications, by a process away from the server, or by any other process or module. Process 400 is further shown to include step 406, where the hierarchical result is used to create a graphical representation of the result for display (e.g., at a client, on a report, on a local electronic display system, etc.). A graphical user interface including a tool for allowing a user to define new hierarchical models or to revise a previously defined hierarchical model may further be provided to a user via a display system or client. In step 408 of process 400, at least a portion of the hierarchical result is traversed to generate a report. In step 410 of process 400, the hierarchical result or a group of results may be processed by one or more processing modules, reporting modules, or user interface modules for further analysis of the BMS or for any other purpose (e.g., to further format or transform the results).

Figure 5:
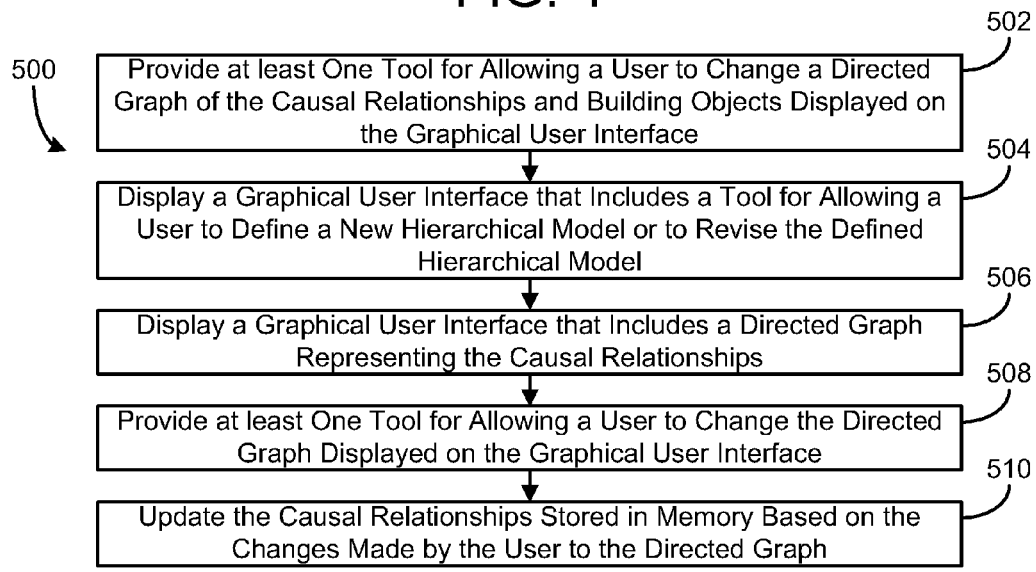
FIG. 5 is a flow diagram of a process for providing a graphical user interface that allows users to view or interact with a causal relationship model, according to an exemplary embodiment.

Referring now to FIG. 5, a flow diagram of a process 500 to provide a graphical user interface for allowing users to view or interact with a causal relationship model is shown, according to an exemplary embodiment. Process 500 includes providing at least one tool (e.g., to a graphical user interface, as a text-based interface, etc.) for allowing a user to view or to change a directed graph of the causal relationships and building objects displayed on the graphical user interface (step 502). The tool for changing the directed graph may be the same as the tool for identifying the objects and the relationships elsewhere in the system or process, or may be a different tool for conducting revisions after an initial modeling. Process 500 also includes displaying a graphical user interface that includes a tool for allowing a user to define a new hierarchical model or to revise the hierarchical model (step 504). Process 500 further includes displaying a graphical user interface that includes a directed graph representing the causal relationships (step 506). Process 500 also includes providing at least one tool for allowing a user to change the directed graph displayed on the graphical user interface (step 508). Finally, process 500 includes updating the causal relationships stored in memory based on the changes made by the user to the directed graph (step 510).

Figure 6:
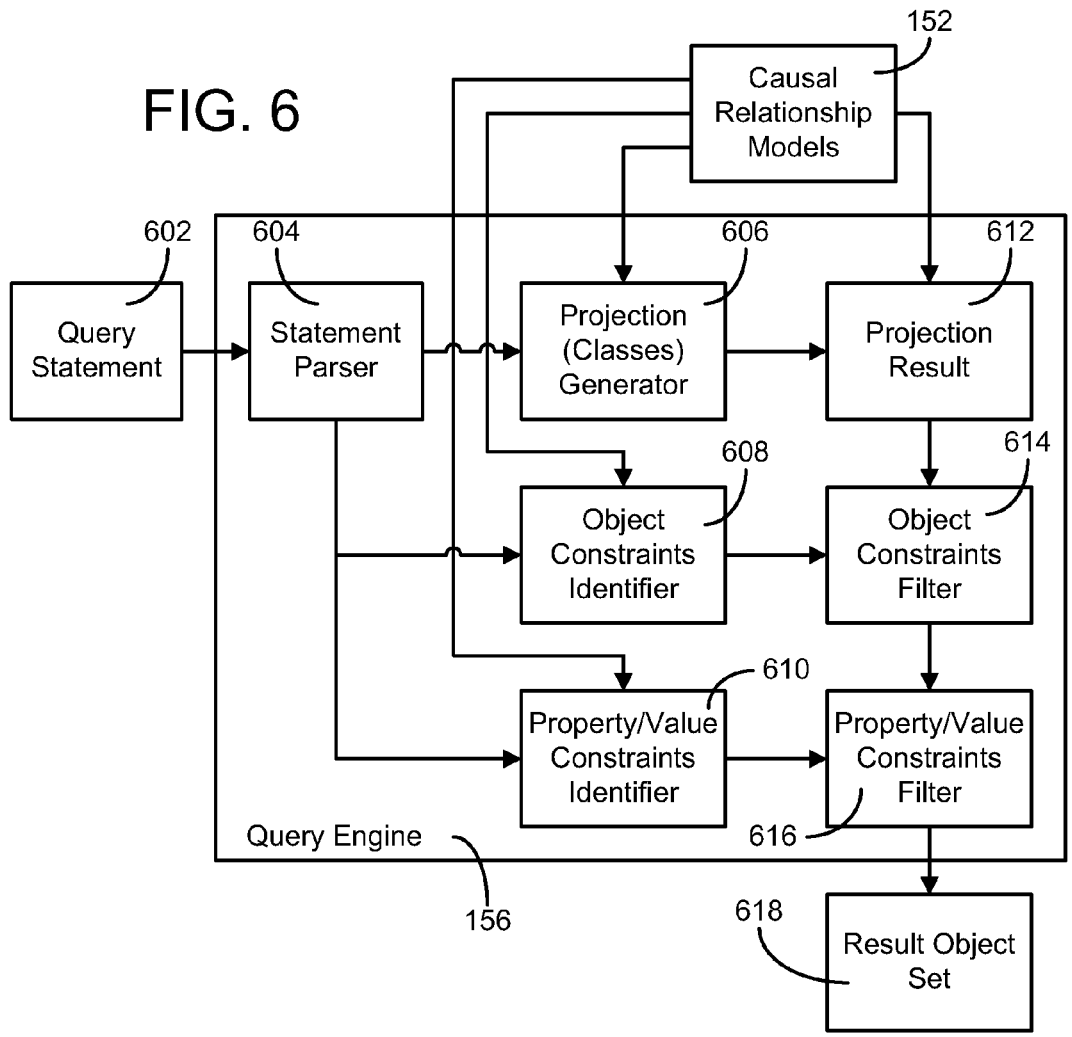
FIG. 6 is a block diagram of the query engine shown in FIGS. 1C and 1D, according to an exemplary embodiment.

Referring now to FIG. 6, query engine 156 is shown in greater detail, according to an exemplary embodiment. Query engine 156 can use the causal relationship and hierarchical projection and methods described above to allow inspection (e.g., querying, searching, etc.) within the graph through structured searches. According to an exemplary embodiment, query statement 602 may be provided to query engine 156 via user interface module 144, client services 146, or application services 148. In this way, a module of the computer system, a client process, or a user via a graphical user interface or another tool (e.g., text-based query engine) may submit a structured query statement 602 to query engine 156. In some embodiments, query engine 156 resides remotely from interface module 144 and from services 146, 148 and communicates with them via middleware 14 over a network. Query engine 156 is configured to receive and parse the structured query statement 602 using statement parser 604. The parsing may seek out key words (e.g., causal relationships, object types, object names, class names, property names, property values, etc.) in query statement 602. Key words that are found may be used by projection generator 606 to construct (e.g., using a computerized process) a hierarchical model for use in conducting a search for relevant objects or for filtering the search via one or more filtering steps. In one exemplary embodiment, parsing of the statement results in: (a) an identification or generation of relevant classes via projection generator 606; (b) an identification of object constraints via object constraints identifier 608; and (c) an identification of property/value constraints via property/value constraints identifier 610. Query engine 156 applies the query aspects identified by projection generator 606, object constraints identifier 608 and property/value constraints identifier 610 to causal relationship models 152 in series to arrive at a result object set 618.

As an example of how query engine 156 operates, an example query statement is given:

"All Conference Rooms on Floor 3 of either Building 1, 2, or 3 with an an Office Temperature of Greater Than 72 Degrees"

Such a statement may be parsed by query engine 156 to:

a) Identify classes of Conference Room, Floor, and Building from the statement using projection generator 606. Using these identified keywords/classes, projection generator 606 may generate a hierarchical model that would provide a structured hierarchical tree of conference rooms, their floors, and their buildings. Query engine 156 may apply the generated hierarchical tree to the one or more causal relationship models 152 to return hierarchical projection results 612 of the conference rooms, floors and buildings, as well as particular properties and values of each object.

b) Identify the object constraints using object constraints identifier 608. Then, using the object constrains identified by object constraints identifier 608, for example, query engine 156 would use object constraints filter 614 to filter the projection results 612 to only those conference rooms with the set of object constraints requested by query statement 602 in their grouping. For example, only those conference rooms on the third floor of Buildings 1, 2, or 3 would remain in a hierarchical result set after filtering using the identified object constraints.

c) Identify the property and value constraints using property/value constraints identifier 610. Then, using the property and value constraints identified by property/value constraints identifier 610, query engine 156 would use property/value constraints filter 616 to filter the hierarchical result set to only those conference rooms with building objects whose temperature is "Greater Than 72 Degrees." After the object selection and the two filtering steps, the resultant hierarchical data set will be information and context rich for ease of processing and reporting back to the user or for action by one or more computing processes.

Determining the Root Cause of Faults in a Building Management System

Referring again to FIGS. 1C-D, memory 138 is also shown to include performance indexing module 164. Performance indexing module 164 is configured to calculate, update, or otherwise maintain calculations of performance indexes 158 for the BMS equipment. Memory 138 further includes event analysis module 162. Event analysis module 162 can analyze, for example, event information 160 received from the BMS (e.g., BMS subsystems, BMS equipment, etc.) via BMS interface 132. In some embodiments, event analysis module 162 may analyze the event information 160 based on performance indexes 158.

Memory 138 also includes system analysis module 166. System analysis module 166 may be configured to execute a computerized method for evaluating and reporting a cause of a performance change in a building management system. The computerized method includes traversing a causal relationship model (e.g., stored in causal relationship models 152) including the building equipment associated with the fault to determine a root cause of the fault.

Performance indexing module 164 may be configured to detect changes (e.g., state changes, undesirable changes, sudden changes, etc.) in performance index values in performance indexes 158. System analysis module 166 can analyze the cause of the change detected by performance indexing module 164. In response to a detected change, for example, system analysis module 166 may cause the recall of event information 160 associated with the equipment experiencing a performance issue.

Performance indexes 158 may include one or more performance indexes for a variety of BMS equipment (e.g., door access pad 106, chiller 30, etc.), BMS subsystems, portions of BMS subsystems, or for BMS portion spanning multiple subsystems. A performance index may be created or maintained in performance indexes 158 for each piece of BMS equipment having a performance parameter available for tracking or indexing. In some embodiments, all of the indexes of performance indexes 158 may be created and maintained by performance indexing module 164. In other embodiments, the data for performance indexes 158 may be recalled or received and stored by a different module (e.g., a data gathering module) and performance indexing module 164 may be configured to calculate, for example, an overall performance index value for the equipment.

Event information 160 may be an archive of BMS events for the BMS equipment (e.g., as an event list, an event database, etc.). Event information 160 may be created by event analysis module 162. For example, as event information is received from the BMS via BMS interface 132, event analysis module 162 may be configured to conduct fault detection on the received information. For events possibly relating to a fault or an abnormal condition (e.g., temperature that is higher than expected), event analysis module 162 may then store event information in event information 160 for later retrieval. Event information 160 may be stored with, for example, a timestamp or other identifier from which at least a relative time may be derived.

Event information 160 may be recalled based on a temporal parameter in addition to a relationship to the detected change in performance indexes 158. For example, event information 160 may be recalled by identifying anomalous events occurring closest to the time at which the performance index value in performance indexes 158 changed. System analysis module 166 may be configured to conduct varying levels of actual event analysis. In some embodiments, for example, system analysis module 166 will actually include routines or functions for conducting analysis. In other embodiments system analysis module 166 calls or coordinates routines or functions of performance indexing module 164, event analysis module 162, or other modules of the system.

Event analysis module 162 or system analysis module 166 may be configured to provide data to user interface module 144, client services 146 and/or to application services 148 to cause the display of an indication of a change in performance indexes 158 and a representation of event information 160. For example, a GUI alert with the following text may be displayed on UI clients 16: "HVAC Performance Poor for Zone 1—Associated Events: AHU for Zone 1 began to provide 'Low Flow Rate' events as early as 2:34 a.m.—Recommended Action: Check for an obstruction of the air flow in or around the AHU for Zone 1." In an exemplary embodiment the air handling unit (AHU) may have multiple quality metrics such as: hours of time running, fan speed, output flow rate, and deviation from setpoint. Each of these metrics may have individual performance index values and an overall performance index value for the AHU may be calculated by, for example, averaging the performance index values for each metric. In some exemplary embodiments the overall index of the equipment is discounted over time or because of some other value or state. For example, a process of the system may discount the performance index value (e.g., by one point an hour) for each hour that the AHU's overall performance index value is within the "bad" range (e.g., on a 0-100 point scale, 0-33 may be considered "bad"). Accordingly, while the performance index value may drop just below 33 (e.g., 30) based on actual calculations, over time the performance index value will be caused to approach zero. The system may be able to update a display of the performance index value to indicate its downward trend (e.g., with a down arrow, by showing the number in red, etc.).

Event information 160 is retained for the metrics or subsystems of the AHU for later analysis. For example, a "fan speed too low" event (e.g., calculated by an event analysis module or otherwise) may be detected and stored with a timestamp. Next, a "temperature above setpoint" event may be detected and stored with a timestamp. When it is detected that the AHU's overall performance index value has changed and dropped into the "bad" state, both the performance indexes and the event information may be used to help identify the problematic equipment (or subsystems of equipment) and to suggest corrective actions for technicians to take to remedy the issue. For example, using the performance index values of many pieces of equipment in a BMS, the computer system may identify those changed to the "bad" state. In response to this detection, the computer system may query for the closest related event (in time) prior to the change to the "bad" state. This event may be evaluated for whether it is a possible cause of the state change. The evaluation may use, for example, causal relationship models as described below and may include an analysis intended to simulate the question of: "could this event for another piece of equipment have caused this equipment's performance to drop?" If the answer is yes, the system may further investigate the cause for the event. For example, another query may be run for events occurring prior to the first identified event and associated with equipment having an appropriate causal relationship with the equipment associated with the first identified event. If the earlier event could not have caused the performance to drop, the system may query for other early events that could have caused the performance index to drop prior to the first identified event.

Various exemplary embodiments of the system could work in a variety of ways. For example, in one embodiment, the system may gather the first six events that occurred prior to the performance index change. Once gathered, the system could check each potential event for a causal relationship to overall equipment performance degradation. The process may be iterative (traversing backwards from final performance change or fault to an initial event that may have caused the change) until a primary or root cause for the performance change is identified. Using such a process, the system may be able to group or tag received events into "symptoms" or "causes" categories. By primarily reporting the "causes" category of events to users, the system may advantageously reduce the "noise" of unimportant events or alarms and direct users or technicians to the root causes for system problems.

In the AHU example, when the performance index value in performance indexes 158 changes from "good" to "bad", the closest time-wise event in event information 160 to the performance index value degradation may be a "temperature above setpoint" event. Event analysis module 162 may identify this event as a "symptom" type event and continue working backward in time and/or via causal relationship models 152 to find a "fan speed low" event that occurred prior to the "symptom" event. Accordingly, event analysis module 162 may determine that the fan speed event describes the probable initial failure in the AHU and provide event data to user interface module 144 and/or to client services 146, which presents that event to the user via a display in UI clients 16. The setpoint event is identified as a secondary symptom of the primary cause.

In an alternative embodiment, the system may use causal relationship models 152 and resultant "symptom" and "causes" determinations by event analysis module 162 for fault suppression or highlighting. Those events that are "causes" of further systematic performance degradation may be highlighted or displayed prominently on UI clients 16. Events that are determined to be "symptoms" may be suppressed from view or displayed as secondary events on UI clients 16.

By way of another example, system analysis module 166 may use the causal relationship model shown in FIG. 2B to detect and diagnose a fault relating to the temperature in conference room 102. For example, controller 12 may receive temperature data from a temperature sensor in conference room 102 via BMS interface 132 (e.g., the current temperature is 75° F.) and store the data as event information 160. Performance indexes 158 may include a setpoint temperature for the environment of conference room 102 (e.g., a setpoint temperature of 70° F.) created by performance indexing module 164 in response to data provided by a user via UI client 16.

In some embodiments, controller 12 may receive a request from a user (e.g., via user interface module 144, client services 146, etc.) for more information about the increase in temperature for conference room 102. For example, controller 12 may provide information about conference room 102 from performance indexes 158, event information 160, and/or query engine 156 to the user. System analysis module 166 may then receive a request from the user (e.g., via user interface module 144, client services 146, etc.) to traverse causal relationship models 152 to retrieve possible causes of the increase in temperature. In other embodiments, system analysis module 166 automatically traverses causal relationship models 152 and provides this information to UI clients 16 and/or to remote applications 18.

System analysis module 166 may analyze temperature events in event information 160 and detect that the temperature has risen from 73° F. to 75° F., despite performance indexes 158 having a setpoint of 70° F. for conference room 102 (i.e., the rise in temperature is a symptom of a potential fault). System analysis module 166 may access the causal relationship model shown in FIG. 2B within causal relationship models 152 to analyze the symptom. Based on the causal relationship model, conference room 102 is ventilated by VAV box 110, which is controlled by AHU 34, which is in turn chilled by chiller 30. System analysis module 166 may then analyze events relating to VAV box 110, AHU 34, and/or chiller 30. For example, event information 160 may include information indicating that measured temperatures in VAV box 110 and AHU 34 have also risen (i.e., are causes for the rise in temperature of conference room 102). These events may also be symptoms in their own right (e.g., the temperature in VAV box 110 is higher than its corresponding setpoint in performance indexes 158).

Event information 160 may also include information indicating that the prerotation vanes of the compressor in chiller 30 have not changed position for a period of time and is the root cause of the increase in temperature of conference room 102. Similarly, causal relationship models 152 may include a causal relationship model for the components of chiller 30 (e.g., a compressor, prerotation vanes, a condenser, etc.). In this way, system analysis module 166 can use causal relationship models 152, performance indexes 158, and event information 160 to traverse information relating to the increase in temperature of conference room 102 back to chiller 30. System analysis module 166 can then use the traversed data to request additional event data from event analysis module 162 and provide it to UI clients 16 and/or to remote applications 18.

Figure 7:
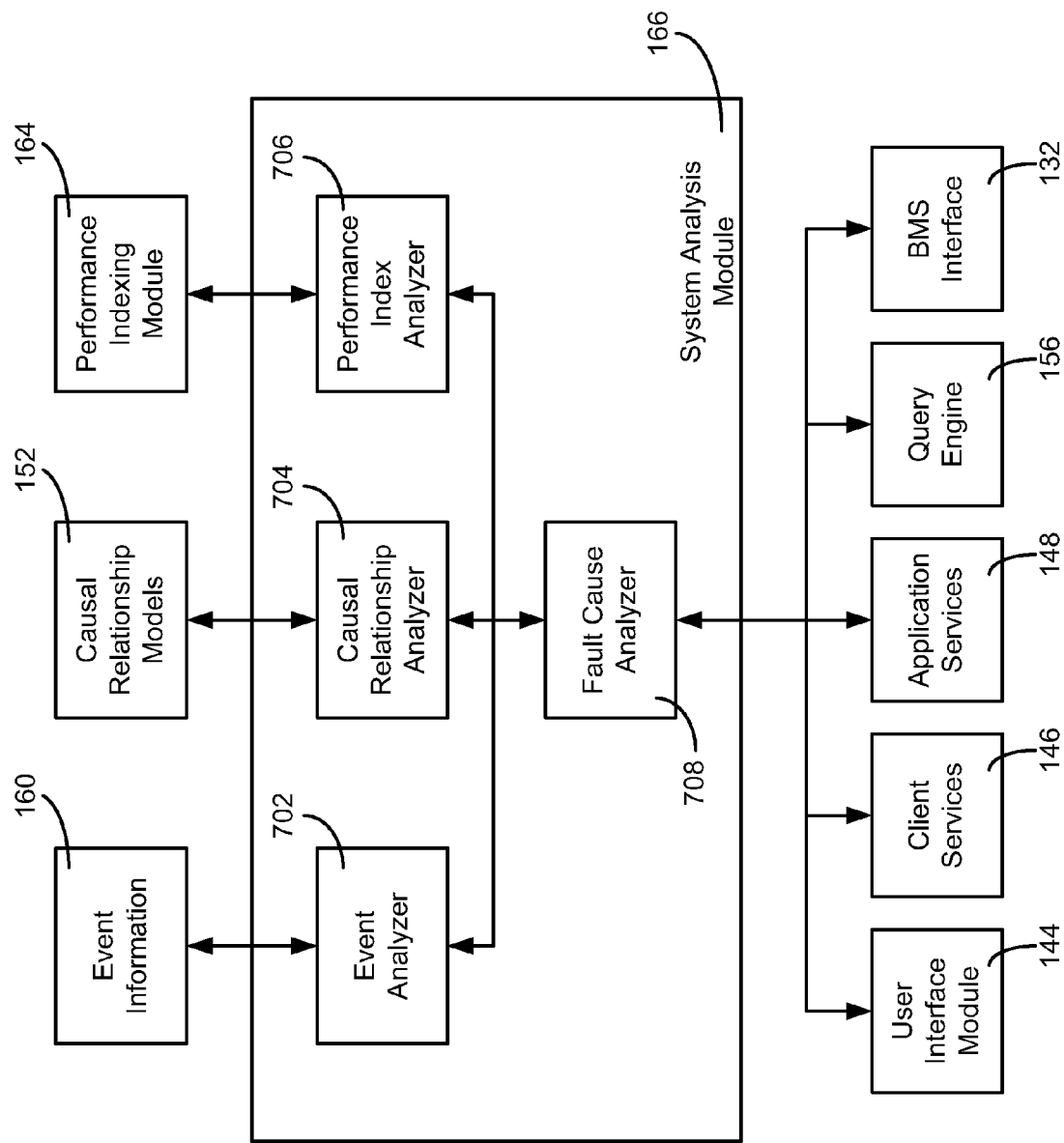
FIG. 7 is a block diagram of the system analysis module shown in FIGS. 1C and 1D, according to an exemplary embodiment.

Referring now to FIG. 7, system analysis module 166 of FIGS. 1C and 1D is shown in greater detail, according to an exemplary embodiment. System analysis module 166 includes fault cause analyzer 708. Fault cause analyzer 708 coordinates the functions of event analyzer 702, causal relationship analyzer 704 and performance index analyzer 706 to determine the root cause of a detected fault.

System analysis module 166 further includes performance index analyzer 706. Performance index analyzer 706 receives performance index data from performance indexing module 164 or performance indexes 158 shown in FIGS. 1C and 1D. The performance index data may be performance index values, measured values from the BMS, or an indication that performance indexing module 164 has detected a change in a performance index value. In some embodiments, performance indexing module 164 provides the performance index data to system analysis module 166 in response to a request from performance index analyzer 706. For example, performance index analyzer 706 may request one or more performance index values from performance indexing module 164 relating to a damper within an AHU that may be associated with a cause for a fault. In other embodiments, performance indexing module 164 provides the performance index data to system analysis module 166 without a request from performance index analyzer 706. For example, performance indexing module 164 may provide an indication to performance index analyzer 706 that a measured temperature value is moving away from a setpoint value. In yet other embodiments, performance index analyzer 706 accesses performance indexes 158 directly, without performance indexing module 164.

System analysis module 166 is also shown to include event analyzer 702. Event analyzer 702 receives event data from event information 160 and performs further analysis on the event data. In some embodiments, the event data is provided automatically to event analyzer 702 by event information 160 or by event analysis module 162. For example, an event indicating a stuck damper in an AHU may be provided automatically to event analyzer 702 for further action. In other embodiments, event information 160 may provide event data to event analyzer 702 in response to a request from event analyzer 702. The requested events may or may not be fault events. For example, event analyzer 702 may request events with timestamps prior to timestamp associated with a detected fault. In some embodiments, event analysis module 162 shown in FIGS. 1C and 1D is incorporated into event analyzer 702. In other embodiments, event analysis module 162 is a separate module that performs some of the functionality of event analyzer 702.

System analysis module 166 is further shown to include causal relationship analyzer 704. Causal relationship analyzer 704 may retrieve one or more causal relationship models relating to event information 160 and/or to the performance index data provided by performance indexing module 164. Multiple relationships of the causal relationship model may be traversed prior to making any root cause decisions. In an exemplary embodiment, performance index data and/or event data for multiple branches of a causal relationship model may be analyzed before a root cause decision is made by system analysis module 166.

In one embodiment, fault cause analyzer 708 begins a process of determining a cause of a detected fault in response to performance indexing module 164 detecting an undesirable change in a performance index value (i.e., something which may be defined as a system fault). When performance index analyzer 706 determines that a performance index change corresponds to a fault, performance index analyzer 706 may then provide a fault indication and relevant information to fault cause analyzer 708. In response to such indication and the relevant information, the fault cause analyzer 708 can begin a process for determining a cause of the fault. For example, change in a performance index that tracks power usage of a cooling system may be reported to the fault cause analyzer 708. In response to this information, the fault cause analyzer 708 traverses a causal relationship model for the cooling system. The causal relationship traversal may first inspect performance index information and event information for a local VAV box before traversing backwards through other devices (e.g., actuators, field controllers, temperature sensors, an economizer, a cooling tower, a chiller, etc.) of the cooling system's causal relationship model. The fault cause analyzer 708 can utilize a recursive and/or iterative approach to traversing the causal relationship model(s) of the system. Fault cause analyzer 708 can traverse multiple parallel branches or paths of a causal relationship model (e.g., a causal relationship model organized as a directed graph). Fault cause analyzer 708 may cause performance index or event analysis to be conducted on the multiple parallel branches or paths of the causal relationship model to select a branch or path that is most likely associated with the root cause for a fault.

Fault cause analyzer 708 can be triggered to begin determining a cause of a detected fault in response to an event received by event analyzer 702. For example, a received event may denote that a raw measured temperature value has increased above a specific value. Event analyzer 702 can include a rule engine to determine whether such an event corresponds to a fault. Event analyzer 702 can provide an indication of this determination and any relevant event information to fault cause analyzer 708. In response to receiving such indication or information, fault cause analyzer 708 can begin a process for determining a root cause for the fault.

In one embodiment, fault cause analyzer 708 may request additional information about the BMS equipment associated with the fault from event analyzer 702, causal relationship analyzer 704, and/or performance index analyzer 706. For example, system analysis module 166 may determine that a fault has occurred relating to a room temperature sensor. In response to this determination, fault cause analyzer 708 may request recent events related to the temperature sensor from event analyzer 702. For example, fault cause analyzer 708 may provide an instruction to event analyzer 702 to retrieve all temperature sensor events within ten minutes of the detected fault. Fault cause analyzer 708 may then request one or more causal relationship model for the temperature sensor from causal relationship analyzer 704. Fault cause analyzer 708 may further request any or all performance index data relating to the temperature sensor from performance index analyzer 706.

Fault cause analyzer 708 may use the causal relationships provided by causal relationship analyzer 704 to generate additional requests for event analyzer 702, causal relationship analyzer 704, and/or performance index analyzer 706. For example, a causal relationship model may relate the room temperature sensor to a damper in an AHU and may relate the room temperature sensor to a fan within the AHU. Causal relationship analyzer 704 may iteratively, recursively, or otherwise traverse and retrieve any number of causal relationships from causal relationship models 152. When fault cause analyzer 708 receives a next level (e.g., node, piece of building equipment, etc.) of a causal relationship model, fault cause analyzer 708 may then request additional information about the next level from event analyzer 702, causal relationship analyzer 704, and/or performance index analyzer 706.

In some embodiments, fault cause analyzer 708 utilizes a strictly serial or iterative approach to determining the cause of the fault (e.g., determine the next related piece of equipment, request additional information about the next piece of equipment, process the additional information for root cause, request a next piece of equipment based on another causal relationship, etc.). In other embodiments, one or more processes of fault cause analyzer 708 may be processed in parallel (e.g., multiple branches or paths of a causal relationship model may be processed in parallel). By using the causal relationship models, fault cause analyzer 708 is able to restrict the selection of additional information (e.g., event data, performance index data, etc.) to data that is modeled to cause the fault (e.g., causes a degradation in a performance index value, causes a fault event, etc.).

As an example of an activity that may be conducted by system analysis module 166, performance indexing module 164 may provide an indication to performance index analyzer 706 that a room temperature value is moving away from its setpoint. Performance index analyzer 706 may retrieve and analyze performance index data from performance indexing module 164 relating to the changing temperature value and determine that a fault has occurred. Performance index analyzer 706 may then provide an indication to fault cause analyzer 708 that a fault has been detected. Fault cause analyzer 708 may then provide a request to causal relationship analyzer 704 for all causal relationships for relating to the room temperature sensor that is the source for the faulty temperature changes. Causal relationship analyzer 704 may then retrieve one or more causal relationships from the room temperature sensor to other pieces of BMS equipment by traversing causal relationship models 152. For example, the room temperature sensor may be causally related to a VAV box, an AHU, and a chiller. Causal relationship analyzer 704 may provide these relationships to fault cause analyzer 708, which generates additional requests for the related pieces of equipment. For example, fault cause analyzer 708 may request events from event analyzer 702 related to a vane position sensor in the chiller that is causally related to the room temperature sensor. Fault cause analyzer 708 may restrict the vane position sensor request to events that have occurred within the hours preceding the fault. Fault analyzer 708 may also request performance index data from performance index analyzer 706 related to the chiller (e.g., power consumptions, differences between measured values and setpoints, etc.). In this way, fault cause analyzer 708 is able to restrict the event data and/or performance index data to data that may indicate the root cause of the fault (e.g., that the chiller is not functioning properly). If analysis of one possible source for the fault (e.g., analysis of the chiller equipment forming one portion of the causal relationship model), the fault cause analyzer 708 can use causal relationship analyzer 704 to analyze another portion of the causal relationship model associated with the faulty room temperature sensor. In an exemplary embodiment, fault cause analyzer can analyze a plurality of paths or branches and analysis returns from the different paths can be compared to estimate the root cause for a fault.

Fault cause analyzer 708 can use both temporal information and the causal relationships to determine the cause of a fault. For example, fault cause analyzer 708 may request event data from event analyzer 702 based on the time the fault was detected. For example, fault cause analyzer 708 may provide a request to event analyzer 702 for the most recent event information relative to the time of the fault (e.g., to step backwards in time from the time of the detected change to the most recent event information prior to the fault). In another embodiment, fault cause analyzer 708 may provide a request to performance index analyzer 706 for performance index data within a time frame associated with the time of the detected fault. For example, if the performance index for a room temperature sensor changes, fault cause analyzer 708 may request recent performance index data regarding the energy consumption of a causally-related AHU.

In other embodiments, fault cause analyzer 708 uses statistical analysis to determine likely faults. For example, a statistical model may indicate that an unresponsive damper position measured over a fixed period of time may have a 75% chance of being the root cause of a faulty increase in the room temperature of a room served by the damper. Fault cause analyzer 708 may use statistical analysis to determine which of a plurality of suspect events is most likely to be the root cause for a fault. In some embodiments, for example, fault cause analyzer 708 uses the statistical analysis to generate a set of potential causes of the fault from a plurality of paths of a causal relationship model and uses the statistical analysis to rank the set of potential causes by likelihood of being the root cause of the fault.

Fault cause analyzer 708 may communicate with BMS interface 132 to receive fault data. For example, a field controller may determine that a fault condition exists (e.g., using analysis local to the field controller) and provide an indication of the fault to fault cause analyzer 708. Fault cause analyzer 708 may also provide possible fault causes to other components of the BMS via BMS interface 132.

Fault cause analyzer 708 may also provide the one or more causes of the fault to user interface module 144, client services 146, or application services 148. In some embodiments, fault cause analyzer 708 may receive an indication that a potential fault exists from a user or other BMS services via interface module 144, client services 146, or application services 148. Fault cause analyzer 708 may then determine one or more potential causes of the fault. In other embodiments, fault cause analyzer 708 may also receive additional parameters from the user or BMS that override the default operation of fault cause analyzer 708. For example, fault cause analyzer 708 may receive a parameter to limit its search for a cause of a fault to components of an AHU. In another example, fault cause analyzer 708 may receive a parameter to traverse only a portion of a recalled causal relationship model. In yet another example, a user may manually provide an indication that a fault condition exists to fault cause analyzer 708 via user interface module 144, client services 146, or application services 148 to request a determination of a possible cause. For example, a technician may determine that a damper is stuck and utilize UI client 16 to request a determination of the possible causes from system analysis module 166.

In some embodiments, fault cause analyzer 708 may also receive result object set 618 from query engine 156 and add the fault causes to the set before the set is presented to a user. For example, a user may provide query statement 602 to user interface client 16 to request information about the security system of a building. Controller 12 may process this request to provide information about the various pieces of security equipment in the building, events relating to the equipment, performance data relating to the equipment, potential or detected faults of the equipment, and/or the causes of the faults back to user interface client 16.

Figure 8:
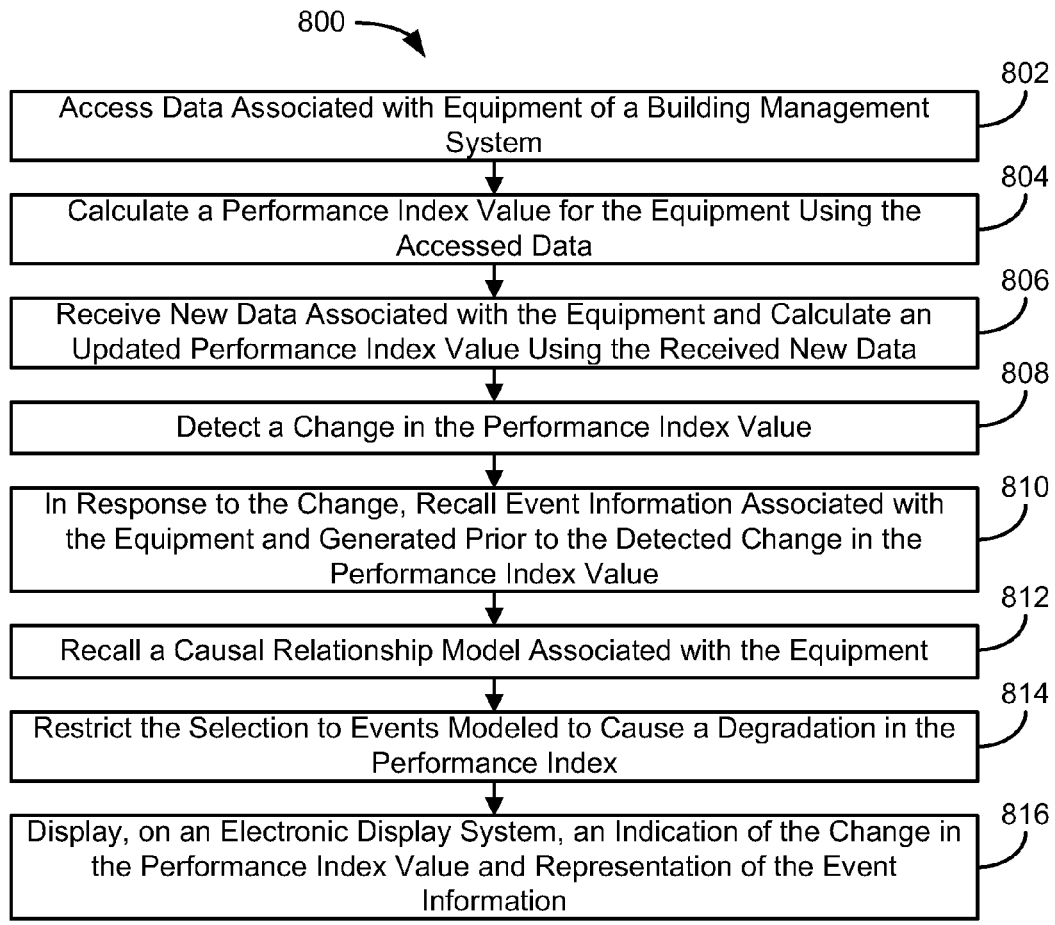
FIG. 8 is a flow diagram of a process for evaluating and reporting a cause of an event in a BMS, according to an exemplary embodiment.

Referring now to FIG. 8, a flow diagram of process 800 for evaluating and reporting a cause of an event in a BMS is shown, according to an exemplary embodiment. Process 800 includes accessing data associated with equipment in the BMS (step 802). The data may be stored locally, recalled from disparate locations, recalled from remote locations, received from a "push"-based process, or otherwise caused to be accessed. For example, some temperature values may be retrieved from a database, while others are retrieved directly from a temperature sensor.

Process 800 further includes calculating a performance index value for the equipment using the accessed data (step 804). Performance indexing may refer to a process (e.g., sub-process) of calculating and assigning relative measures of performance to a piece of equipment based on data received over time or from multiple inputs. A current performance index value of a piece of equipment may be determined via one or a plurality of quality metrics, equations, or other expressions. The result of the calculations may be placed along a normalized scale (e.g., "low-medium-high", "poor-average-good", "0 to 100", etc.). The normalization may be conducted across similar types of equipment, across multiple pieces of equipment of the same type, across facilities, or calculated relative to a maximum possible "score" for that particular piece of equipment. In some embodiments the value of a performance index is calculated based on an overall quality metric for the equipment (e.g., power usage v. effectiveness), on sensor output configured to gauge whether the system is meeting its goals (e.g., the difference between temperature sensor output and temperature setpoint), aggregate subsystem performance, a weighted function having inputs from child equipment, etc. The "child" equipment or subsystems used to gather information for the performance indexing may be obtained or processed using causal relationship models as described below.

Process 800 further includes receiving new data associated with the equipment in the BMS and calculating an updated performance index value for the equipment using the received new data (step 806). The new data may be new setpoint values, sensor values, feedback from BMS control loops, event information, timer values, or any other data pertinent to the performance index.

Process 800 also includes detecting a change in the performance index value (step 808). As previously mentioned, the performance index value calculations can result in other than numbers (e.g., integers, real numbers) to describe performance. For example, the calculation of a performance index value may include passing performance index numbers or other related parameters (e.g., inputs from sensors) through a thresholding process or an expert system. The result of such processing may be a value "state" (e.g., "low-medium-high", "poor-average-good", etc.).

Process 800 further includes recalling, in response to the change, event information associated with the equipment and generated prior to the detected change in the performance index value (step 810). For example, changes in a measured temperature may be stored as events with timestamp information. The temperature change events may be "symptoms" of the underlying fault that caused the change in the performance index value.

Process 800 yet further includes recalling a causal relationship model associated with the equipment (step 812). For example, the equipment associated with the performance index value may be a room temperature sensor and the causal relationship model may include causal relationships between the temperature sensor and various other pieces of HVAC equipment (an AHU, a VAV box, a chiller, etc.).

Process 800 also includes restricting the selection of events recalled in step 810 to events modeled to cause a degradation in the performance index (step 814). In other words, using the causal relationship model, events for further analysis can can be restricted to those events causally modeled to affect a degradation in the performance index. For example, the causal relationship model may relate a room temperature sensor to an AHU that provides conditioned air to the room. Events associated with the AHU are therefore modeled to cause a degradation in the a temperature-related performance index and the AHU associated events may be included in the restricted selection.

Process 800 further includes causing an electronic display system to display an indication of the change in the performance index value and a representation of the event information (step 816). For example, room temperature data determined to be moving away from its setpoint may be displayed with an event indicating that an AHU damper is slow to respond. The selected event information may be presented via the display as a possible root cause for the change in performance index (i.e., a BMS fault).

Figure 9:
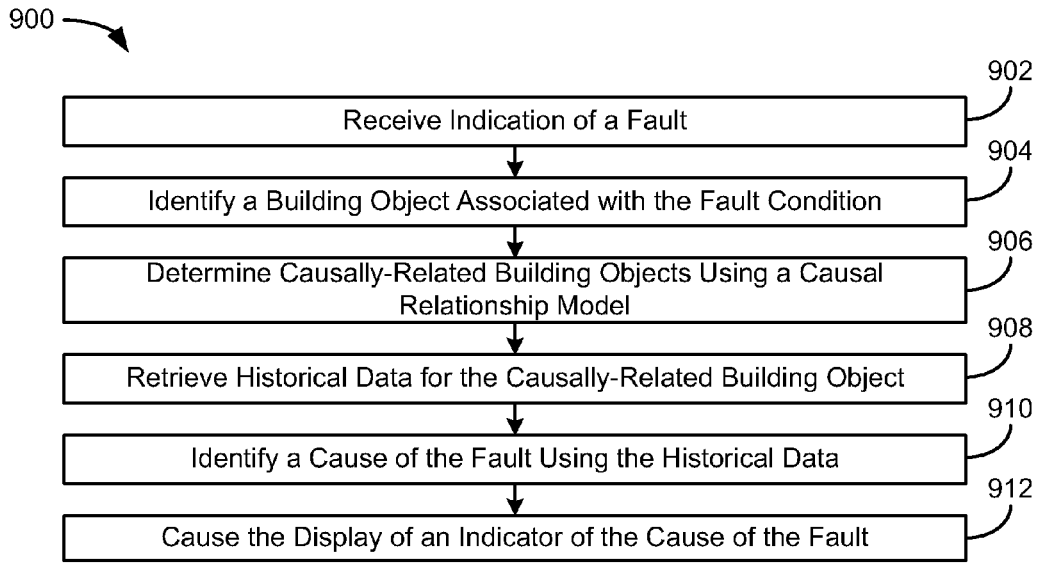
FIG. 9 is a flow diagram of a process for determining a cause of a fault is shown

Referring now to FIG. 9, process 900 for determining a cause of a fault is shown. Process 900 includes receiving an indication of a fault (step 902). In one embodiment, a field device of the BMS automatically determines that a fault exists and provides the indication. For example, a field controller may determine that a performance index value for a measurement has changed and provide an indication of the fault to a supervisory controller. In another embodiment, the indication is received by the BMS device in response to a query to another device. For example, a supervisory controller may periodically poll a field controller for fault events. In yet another embodiment, a user may manually determine that a fault exists and a user interface may provide the fault indication to the BMS device in response to input from the user. For example, a technician may notice that a room temperature is too high and interact with a user interface to determine the root cause. In yet another embodiment, the indication may be received from another memory location in a single BMS device.

Process 900 is also shown to include identifying a building object associated with the fault condition (step 904). For example, a fault may indicate that a specific room temperature building object is associated with the faulty temperature. Process 900 further includes determining causally-related building objects for the building object using a causal relationship model. For example, the room temperature sensor building object may be part of a causal relationship model including other building equipment or objects (e.g., a VAV box, a chiller, a cooling tower, an actuator, an AHU, etc.). These other devices or objects affect the temperature of the room and may be the cause of the increase in the room's temperature.

Process 900 yet further includes retrieving historical data for the causally-related building objects (step 906). The historical data may be events, performance index data, or any other data relating to the operation of the building objects. For example, an AHU fan building object may be associated with fan speed change events and performance indexes relating to the power consumption of the fan. Such data can be analyzed to attempt to determine the root cause for the original temperature fault.

Process 900 also includes identifying a cause of the fault using the historical data (step 908). The root cause may be estimated to be associated with the device or object in the causal relationship model that has the earliest serious abnormality in its history. For example, the room temperature sensor may be causally related to a VAV box, which is controlled by an AHU, which is in turn chilled by a chiller; a relatively early abnormality relating to the chiller may indicate the root cause of the fault and/or any later abnormalities in the causal relationship model.

Process 900 further includes causing the display of an indication of the determined cause of the fault. For example, an indication of the root cause may be displayed on an electronic display to convey the cause to a user. A user can use this information to perform additional diagnostics or repairs for the root cause of the fault.

Figure 10:
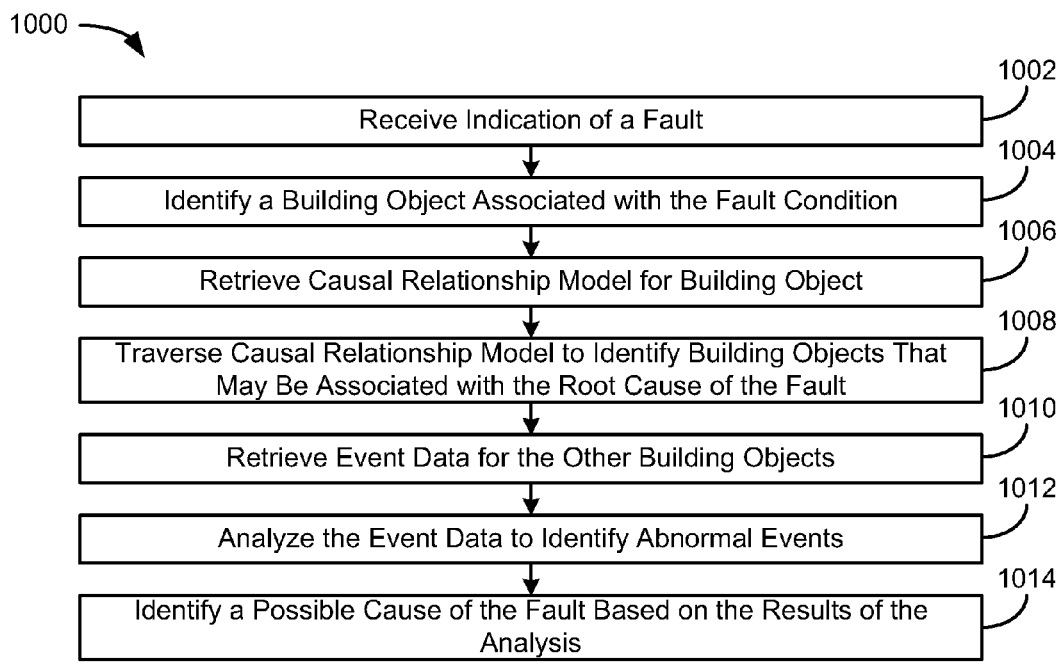
FIG. 10 is a flow diagram of a process for identifying a possible cause of a fault is shown, according to an exemplary embodiment.

Referring now to FIG. 10, a process 1000 for identifying a possible cause of a fault is shown, according to an exemplary embodiment. Process 1000 is shown to include receiving an indication of a fault (step 1002). The indication may be provided by a user interface (e.g., in response to manual input from a user) or automatically by a BMS component (e.g., a fault detector of a supervisory controller or control module, a downstream device that reports a fault, etc.). Process 1000 further includes identifying a building object associated with the fault (step 1004). For example, a fault involving a temperature value may be associated with a temperature sensor building object. Process 1000 is also shown to include retrieving a causal relationship model for the building object (step 1006). The causal relationship model relates the building object to other building equipment or building objects that may have affected the device experiencing the fault. Process 1000 includes traversing the causal relationship model to identify one or more sets of building objects that may be associated with the root cause of the fault (step 1008). Process 1000 further includes retrieving event data for the other building objects (step 1010). For example, event data may be retrieved for the AHU and/or the chiller that are causally-related to the room temperature sensor.

Process 1000 further includes analyzing the event data to identify abnormal events (step 1012). The abnormal events may be fault events themselves or other events indicative of the cause of the fault. For example, if the root cause of a room temperature fault is a stuck damper in an AHU, there may be one or more "stuck damper" events in the event data for a damper building object causally related to a temperature sensor. Process 1000 yet further includes identifying a possible cause of the fault based on the results of the analysis (step 1014). The set of abnormal events identified in step 1012 may be further analyzed to identify the root cause of the fault. For example, a room temperature fault may cause the BMS to identify a chiller fault event and an AHU fault event in step 1012. Since a fault in the chiller may cause the AHU fault (this fact may be determined via traversal of the relevant causal relationship model), the chiller may be identified in step 1014 as the root cause of the room temperature fault.

Figure 11:
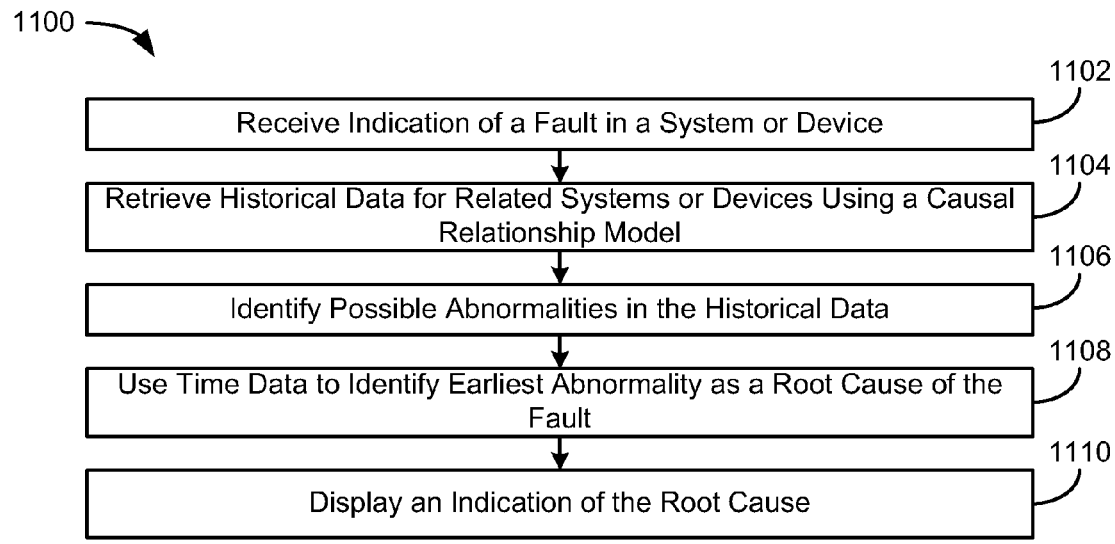
FIG. 11 is a flow diagram of a process for using time data to determine a cause of a fault, according to an exemplary embodiment.

Referring now to FIG. 11, process 1100 for using time data to determine a cause of a fault is shown, according to an exemplary embodiment. Process 1100 includes receiving an indication of a fault in a BMS system or device (step 1102). The indication may be provided by a user interface (e.g., in response to manual input from a user) or automatically by the BMS. Process 1100 also includes retrieving historical data for the related systems or devices using a causal relationship model (step 1104). The historical data may be events, performance index data, or any other data relating to the operation of the building objects that are causally-related to the faulty system or device. Process 1100 also includes identifying possible abnormalities in the historical data (step 1106). The abnormalities may be fault events, events indicative of the cause of the fault, a change in a performance index value, or any other data indicative of the cause of the fault. For example, an increase in the power consumption of a chiller may indicate a cause of a fault related to a room temperature sensor. Process 1100 further includes using time data to identify the earliest abnormality as a root cause of the fault (step 1108). An abnormality for one component of the BMS may cause abnormalities for other components to develop over the course of time. The earliest of the set of abnormalities may then be identified as the root cause of the fault. For example, an abnormality in a chiller may precede an abnormal chilled fluid temperature reading in an AHU, which itself precedes an abnormal temperature reading in a conference room. In this way, a fault associated with the room's temperature can be traced back to the chiller as the root cause of the room temperature fault. Process 1100 further includes causing the display, on an electronic display, of an indication of the root cause (step 1110). A user viewing the display may utilize the displayed root cause to perform additional diagnostics and repairs on the device associated with the root cause.

Figure 12:
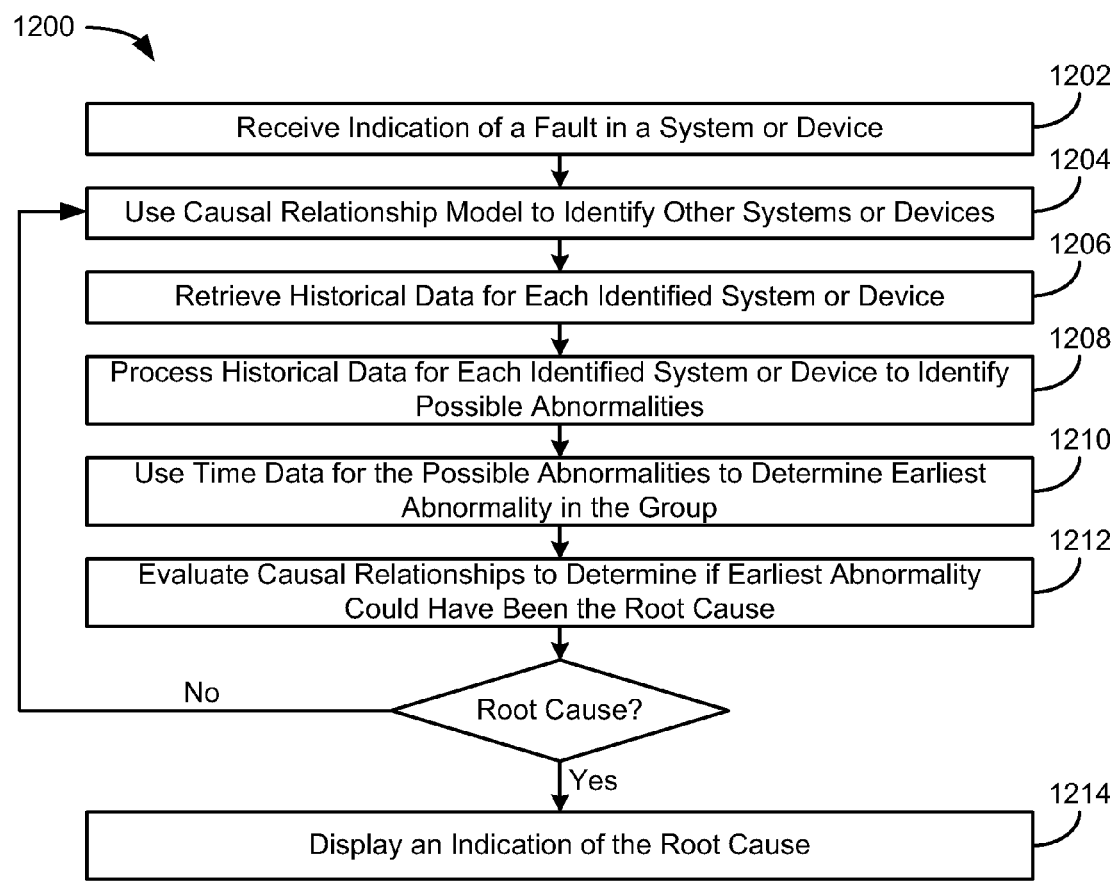
FIG. 12 is a detailed flow diagram of a process for determining a cause of a fault using time data, according to an exemplary embodiment.

Referring now to FIG. 12, process 1200 for determining a cause of a fault using time data is shown. Process 1200 includes receiving an indication of a fault in a system or device. The indication may be provided by a user interface (e.g., in response to manual input from a user) or automatically by the BMS. For example, a fault may relate to a room temperature sensor. Process 1200 also includes using a causal relationship model to identify other systems or devices (step 1204). For example, the room temperature sensor may be causally related to a VAV box, an AHU, and a chiller. Process 1200 further includes retrieving historical data for each identified system or device (step 1206). The historical data may be events, performance index data, or any other data relating to the operation of the devices and systems that are causally-related to system or device associated with the fault. Process 1200 also includes processing the historical data for each identified system or device to identify possible abnormalities (step 1208). The abnormalities may be fault events, events indicative of the cause of the fault, a change in a performance index value, or any other data indicative of the cause of the fault. Process 1200 also includes using time data for the possible abnormalities to determine the earliest abnormality in the group (step 1210). For example, an abnormality in a chiller may precede an abnormal temperature reading in an AHU, which itself precedes an abnormal temperature reading in a conference room.

Process 1200 is further shown to include evaluating causal relationships to determine if the earliest abnormality could have been the root cause (step 1212). This evaluation may include statistical analysis beyond that applied previously in process 1200. For example, statistics for multiple causally related building objects can be statistically compared to determine if the earliest abnormality was a likely cause of the fault. In this way, an iterative approach may be taken to evaluate any number of branches of the causal relationships. If the earliest abnormality could not have been the root cause, process 1200 can identify other causally related systems or devices. In other words, other branches of the causal relationship model may then be evaluated If the causal relationships indicate that the earliest abnormality could be the root cause, process 1200 continues on to causing the display on an electronic display of an indication of the root cause (step 1214). A user viewing the display can then use the root cause information to perform additional diagnostics and repairs for the device.

The construction and arrangement of the systems and methods as shown in the various exemplary embodiments are illustrative only. Although only a few embodiments have been described in detail in this application, many modifications are possible. For example, the position of elements may be varied and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present application.

The present application contemplates methods, systems and program products on any machine-readable media for accomplishing various operations. The embodiments of the present application may be implemented using existing computer processors, or by a special purpose computer processor for an appropriate system, incorporated for this or another purpose, or by a hardwired system. Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for evaluating and reporting a cause of a performance change in a building management system, comprising:
    receiving, at a processing circuit, an indication of a fault for building equipment of the building management system, wherein the indication of the fault is directly associated with an indicator building object;
    receiving, at the processing circuit, a causal relationship model including the indicator building object and other building objects of the building management system, wherein the causal relationship model is an ontological model describing causal relationships between pairs of building objects, wherein each of the causal relationships is a directional relationship between a first building object and a second building object, wherein the causal relationship model includes an indication of a relationship direction and an indication of a relationship type for each of the causal relationships, wherein the indication of the relationship type identifies an effect of multiple possible effects that the first building object has on the second building object; and
    using the processing circuit to determine a root cause of the fault by traversing the causal relationship model, wherein the root cause of the fault is directly associated with a building object causally related to the indicator building object.

2. The computerized method of claim 1, wherein using the processing circuit to determine a root cause further comprises:
    identifying a building object directly associated with the fault;
    determining a causally-related building object using the identified building object and the causal relationship model traversal;
    retrieving historical data for the causally-related building object; and
    using the historical data to identify a cause of the fault.

3. The computerized method of claim 2, wherein the historical data comprises at least one of: time series data, performance index information, and an event history.

4. The computerized method of claim 1, wherein using the processing circuit to determine a root cause further comprises:
    identifying a building object directly associated with the fault;
    retrieving a causal relationship model for the identified building object;
    traversing the causal relationship model to identify a causally-related building object;
    retrieving event data for the causally-related building object;
    analyzing the event data to identify an abnormal event; and
    identifying the root cause based on the results of the analysis.

5. The computerized method of claim 1, further comprising:
    traversing multiple levels of a causal relationship model to find the root cause of the fault, wherein at least one of the multiple levels includes a device of the building management system which is indirectly causally-related to the building equipment for which the indication of a fault is received.

6. The computerized method of claim 1, wherein using the processing circuit comprises:
    retrieving historical data for the other devices of the building management system using the causal relationship model;
    identifying a plurality of possible abnormalities in the historical data;
    using time data in the historical data to identify the earliest abnormality as the root cause of the fault.

7. The computerized method of claim 6, further comprising:
    excluding an earliest abnormality in the historical data due to a determined inconsistency with the causal relationship model.

8. The computerized method of claim 1, wherein using the processing circuit to determine a root cause further comprises:
    traversing the causal relationship model to identify the other devices of the building management system;
    retrieving historical data for each identified device;
    processing the historical data to identify possible abnormalities;
    using time data for the possible abnormalities to determine the earliest identified abnormality; and
    evaluating causal relationships to determine if the earliest abnormality could have been the root cause of the fault.

9. The computerized method of claim 8, wherein using the processing circuit further comprises:
    traversing the causal relationship model to identify additional devices in response to a determination that the causal relationship indicates that the earliest abnormality could not have been the root cause of the fault.

10. The computerized method of claim 1, further comprising:
    using performance indexes, the causal relationship model, and event data to determine which of a plurality of historical building management system events is associated with the root cause for the fault.

11. A computer system for evaluating and reporting a cause of a performance change in a building management system, comprising:
    a processing circuit configured to receive an indication of a fault associated with building equipment of the building management system, wherein the indication of the fault is directly associated with an indicator building object;
    wherein the processing circuit is configured to determine a root cause of the fault by traversing a causal relationship model including the indicator building object and other building objects of the building management system, wherein the causal relationship model is an ontological model describing casual relationships between pairs of building objects, wherein each of the causal relationships is a directional relationship between a first building object and a second building object, wherein the causal relationship model includes an indication of a relationship direction and an indication of a relationship type for each of the causal relationships, wherein the indication of the relationship type identifies an effect of multiple possible effects that the first building object has on the second building object, and wherein the root cause of the fault is directly associated with a building object causally related to the indicator building object.

12. The computer system of claim 11, wherein the processing circuit is further configured to:
identify a building object associated with the fault;
determine a causally-related building object using the identified building object and the causal relationship model;
retrieve historical data for the causally-related building object from a memory; and
use the historical data to identify a cause of the fault.

13. The computer system of claim 11, wherein the processing circuit comprises a memory and the memory comprises a fault cause analyzer that traverses multiple levels of a causal relationship model until the root cause for the fault is determined, wherein at least one of the multiple levels includes a device of the building management system which is indirectly causally-related to the building equipment for which the indication of a fault is received.

14. The computer system of claim 11, wherein the processing circuit is further configured to:
identify a building object associated with the fault;
retrieve a causal relationship model for the identified building object;
traverse the causal relationship model to identify a causally-related building object;
retrieve event data for the causally-related building object;
analyze the event data to identify an abnormal event; and
identify the root cause based on the results of the analysis.

15. The computerized method of claim 11, wherein the causal relationship model comprises a plurality of software defined building objects and wherein at least two of the software defined building objects belong to different building subsystems.

16. The computer system of claim 11, wherein the processing circuit is further configured to:
retrieve historical data for devices related to the building equipment using the causal relationship model;
identify possible abnormalities in the historical data; and
use time data in the historical data to identify the earliest abnormality as the root cause of the fault.

17. The computer system of claim 11, wherein the processing circuit further comprises a system analysis module and the system analysis module comprises an event analyzer, a causal relationship analyzer, a performance index analyzer, and a fault cause analyzer, wherein the fault cause analyzer coordinates the causal relationship traversal, and wherein the fault cause analyzer uses information from the event analyzer and the performance index analyzer to select from a plurality of possible root causes for the fault.

18. The computer system of claim 11, wherein the processing circuit is further configured to:
traverse the causal relationship model to identify other devices;
retrieve historical data for each identified device;
process the historical data to identify possible abnormalities;
use time data for the possible abnormalities to determine the earliest identified abnormality; and
evaluate causal relationships to determine if the earliest abnormality could have been the root cause of the fault;
wherein the processing circuit is configured to traverse the causal relationship model to identify additional devices if the earliest abnormality is determined to not be the root cause of the fault.

19. The computer system of claim 11, wherein traversing the causal relationship model comprises following causal relationship paths that are not coextensive with hardware, logical, or hardware and logical communications connections of the building management system.

20. A non-transitory computer-readable storage medium having stored thereon machine-readable instructions for causing, when executed, one or more machines to perform the following:
receiving an indication of a fault for building equipment of the building management system, wherein the indication of the fault is directly associated with an indicator building object;
determining a root cause of the fault by traversing a causal relationship model including the indicator building object and other building objects of the building management system, wherein the causal relationship model is an ontological model describing causal relationships between pairs of building objects, wherein each of the causal relationships is a directional relationship between a first building object and a second building object, wherein the causal relationship model includes an indication of a relationship direction and an indication of a relationship type for each of the causal relationships, wherein the indication of the relationship type identifies an effect of multiple possible effects that the first building object has on the second building object, and wherein the root cause of the fault is directly associated with a building object causally related to the indicator building object; and
reporting a cause of a performance change in a building management system based on the determined root cause of the fault.

* * * * *